United States Patent
Attanasio et al.

(10) Patent No.: US 11,228,925 B2
(45) Date of Patent: Jan. 18, 2022

(54) PROVIDING UTILIZATION INFORMATION FOR INTELLIGENT SELECTION OF OPERATING PARAMETERS OF A WIRELESS ACCESS POINT

(71) Applicant: Comcast Cable Communications, LLC, Philadelphia, PA (US)

(72) Inventors: Joseph Attanasio, Philadelphia, PA (US); Sukhjinder Singh, Upper Darby, PA (US); James Davey, Jasper, GA (US)

(73) Assignee: Comcast Cable Communications, LLC, Philadelphia, PA (US)

(*) Notice: Subject to any disclaimer, the term of this patent is extended or adjusted under 35 U.S.C. 154(b) by 281 days.

(21) Appl. No.: 14/789,381

(22) Filed: Jul. 1, 2015

(65) Prior Publication Data
US 2017/0006483 A1    Jan. 5, 2017

(51) Int. Cl.
*H04W 24/08* (2009.01)
*H04L 29/08* (2006.01)
(Continued)

(52) U.S. Cl.
CPC ......... *H04W 24/08* (2013.01); *H04L 43/0876* (2013.01); *H04L 67/125* (2013.01);
(Continued)

(58) Field of Classification Search
USPC ........................................................ 370/252
See application file for complete search history.

(56) References Cited

U.S. PATENT DOCUMENTS 6,522,881 B1    2/2003    Feder et al.
7,489,661 B2    2/2009    Hills et al.
(Continued)

FOREIGN PATENT DOCUMENTS

CN    101784073 A    7/2010
WO    2014158131 A1    10/2014

OTHER PUBLICATIONS

Dalal, Upena D., and Y. P. Kosta. "Adaptive Parameters Based Transmission Control and Optimization in Mobile WiMAX at Physical Layer." (2009).
(Continued)

*Primary Examiner* — Gregory B Sefcheck
*Assistant Examiner* — Majid Esmaeilian
(74) *Attorney, Agent, or Firm* — Banner & Witcoff, Ltd.

(57) ABSTRACT

Aspects of the disclosure are directed toward intelligently selecting the operating parameters of wireless access points (WAPs) deployed in a wireless environment so as to minimize or at least reduce interference in that wireless environment. A WAP continually measures the characteristics of the wireless channels used in the wireless environment and obtains measurements of channel metrics for those channels. The WAP stores the channel metric measurements as a channel metric history and analyzes the channel metric history to determine correlations between the channel metric measurements and various timeframes. The WAP selects one or more of its operating parameters based on the channel metric history and the correlations identified. Operating parameters include the radio frequency band and channel to transmit on. A centralized control server may also receive, store, and analyze channel metric histories from multiple WAPs and issue instructions to those WAPs identifying values for their respective operating parameters.

23 Claims, 10 Drawing Sheets

(51) Int. Cl.
  *H04W 52/22* (2009.01)
  *H04W 16/04* (2009.01)
  *H04L 12/26* (2006.01)
  *H04W 40/24* (2009.01)
  *H04W 72/08* (2009.01)
  *H04W 52/14* (2009.01)
  *H04W 24/02* (2009.01)

(52) U.S. Cl.
  CPC ............ *H04L 67/34* (2013.01); *H04W 16/04* (2013.01); *H04W 24/02* (2013.01); *H04W 40/244* (2013.01); *H04W 52/228* (2013.01); *H04W 72/082* (2013.01); *H04W 52/143* (2013.01); *H04W 52/223* (2013.01)

(56) References Cited

U.S. PATENT DOCUMENTS

| | | | |
|---|---|---|---|
| 8,462,751 B1 * | 6/2013 | Dehghan | H04L 12/1485 370/338 |
| 8,824,442 B2 | 9/2014 | Lea et al. | |
| 9,179,346 B1 * | 11/2015 | Pawar | H04W 28/00 |
| 9,319,932 B2 | 4/2016 | Yang et al. | |
| 2004/0047324 A1 | 3/2004 | Diener | |
| 2007/0168200 A1 | 7/2007 | Shimizu | |
| 2007/0280332 A1 | 12/2007 | Srikanteswara et al. | |
| 2008/0069063 A1 * | 3/2008 | Li | H04W 88/06 370/338 |
| 2008/0281979 A1 * | 11/2008 | Keeler | H04L 47/2475 709/233 |
| 2010/0085907 A1 | 4/2010 | Yasumoto | |
| 2010/0177639 A1 | 7/2010 | Nam | |
| 2010/0250746 A1 | 9/2010 | Murase | |
| 2011/0088631 A1 * | 4/2011 | Hsieh | G02B 6/12016 119/172 |
| 2011/0103242 A1 | 5/2011 | Hittel et al. | |
| 2011/0244904 A1 * | 10/2011 | Sagae | H04W 48/10 455/507 |
| 2011/0250882 A1 * | 10/2011 | Gao | H04W 24/10 455/423 |
| 2011/0286401 A1 * | 11/2011 | Wijting | H04W 8/20 370/329 |
| 2012/0026882 A1 | 2/2012 | Park et al. | |
| 2012/0028664 A1 * | 2/2012 | Zhang | H04W 16/14 455/501 |
| 2012/0045012 A1 | 2/2012 | Alapuranen | |
| 2012/0122463 A1 | 5/2012 | Chen et al. | |
| 2013/0142511 A1 | 6/2013 | Spraggs et al. | |
| 2013/0154822 A1 * | 6/2013 | Kumar et al. | H04W 24/08 |
| 2013/0272285 A1 | 10/2013 | Goldsmith et al. | |
| 2013/0281143 A1 | 10/2013 | Nentwig et al. | |
| 2014/0003380 A1 | 1/2014 | Han et al. | |
| 2014/0036691 A1 | 2/2014 | Madan et al. | |
| 2014/0036816 A1 | 2/2014 | Madan et al. | |
| 2014/0044054 A1 | 2/2014 | Kim et al. | |
| 2014/0071846 A1 | 3/2014 | Hintersteiner et al. | |
| 2014/0086168 A1 | 3/2014 | Bao et al. | |
| 2014/0092860 A1 | 4/2014 | Kneckt et al. | |
| 2014/0119316 A1 | 5/2014 | Linden et al. | |
| 2014/0233502 A1 | 8/2014 | Fong et al. | |
| 2014/0256329 A1 * | 9/2014 | Cao | H04W 16/08 455/444 |
| 2014/0314003 A1 | 10/2014 | Zhou et al. | |
| 2014/0349745 A1 * | 11/2014 | Russo | A63F 13/12 463/29 |
| 2014/0369242 A1 | 12/2014 | Ng et al. | |
| 2014/0376496 A1 | 12/2014 | Kozaki et al. | |
| 2015/0016353 A1 | 1/2015 | Lee | |
| 2015/0023202 A1 | 1/2015 | Shattil | |
| 2015/0029959 A1 | 1/2015 | Da et al. | |
| 2015/0043363 A1 * | 2/2015 | Koskinen | H04W 16/14 370/252 |
| 2015/0055569 A1 | 2/2015 | Ju et al. | |
| 2015/0063323 A1 | 3/2015 | Sadek et al. | |
| 2015/0078346 A1 | 3/2015 | Farhadi et al. | |
| 2015/0103685 A1 | 4/2015 | Butchko et al. | |
| 2015/0126207 A1 * | 5/2015 | Li | H04W 72/082 455/452.1 |
| 2015/0189513 A1 | 7/2015 | Schmidt et al. | |
| 2015/0245354 A1 | 8/2015 | Yacovitch et al. | |
| 2015/0270882 A1 | 9/2015 | Shattil | |
| 2015/0271829 A1 | 9/2015 | Amini et al. | |
| 2015/0271837 A1 | 9/2015 | Larsson et al. | |
| 2015/0312900 A1 | 10/2015 | Pajukoski et al. | |
| 2015/0318965 A1 | 11/2015 | Sawai | |
| 2015/0350949 A1 * | 12/2015 | Wang | H04W 16/14 370/230 |
| 2015/0351026 A1 * | 12/2015 | Lee | H04W 40/244 370/237 |
| 2016/0183181 A1 | 6/2016 | Lee et al. | |
| 2016/0219408 A1 | 7/2016 | Yang et al. | |

OTHER PUBLICATIONS

Sridharan, M., et al. "NVGRE: Network virtualization using generic routing encapsulation." IETF draft (2011).
Nov. 29, 2016—(EP) Extended Search Report—App 16177542.4.
Extended European Search Report—EP Application No. 16193955.8—dated Mar. 8, 2017.
Dec. 19, 2017—European Office Action—EP 16177542.4.

* cited by examiner

|     504     |    506  |   510      |   512                |   508              |
|-------------|---------|------------|----------------------|--------------------|
| Frequency Band | Channel | No. Clients | Bandwidth Utilization | Timestamp |
| 2.4 | 1 | 1 | 10% | 2015-02-24 06:00:00 |
| 2.4 | 1 | 1 | 10% | 2015-02-24 06:10:00 |
| 2.4 | 1 | 2 | 15% | 2015-02-24 06:20:00 |
| 2.4 | 1 | 2 | 15% | 2015-02-24 06:30:00 |
| ... | ... | ... | ... | ... |
| 2.4 | 1 | 5 | 65% | 2015-02-24 07:00:00 |
| 2.4 | 11 | 5 | 65% | 2015-02-24 07:10:00 |
| 2.4 | 11 | 6 | 85% | 2015-02-24 07:20:00 |
| ... | ... | ... | ... | ... |

FIG. 5A

| ID No. | Frequency Band | Channel | No. Clients | Bandwidth Utilization | Utilization Level | Timestamp |
|--------|----------------|---------|-------------|-----------------------|-------------------|-----------|
| 2240 | 2.4 | 1 | 0 | 1% | Perfect | 2015-02-24 06:00:00 |
| 2240 | 2.4 | 1 | 0 | 1% | Perfect | 2015-02-24 06:10:00 |
| 2240 | 2.4 | 1 | 1 | 10% | Good | 2015-02-24 06:20:00 |
| 2240 | 2.4 | 1 | 4 | 35% | Good | 2015-02-24 06:30:00 |
| ... | ... | ... | ... | ... | | ... |
| 2240 | 2.4 | 1 | 7 | 70% | Impaired | 2015-02-24 07:00:00 |
| 2240 | 2.4 | 1 | 8 | 85% | Impaired | 2015-02-24 07:10:00 |
| 2240 | 2.4 | 1 | 10 | 95% | Impaired | 2015-02-24 07:20:00 |
| ... | ... | ... | ... | ... | ... | ... |

FIG. 5B

| ID No. | Status | Day | Timestamp |
|--------|--------|-----|-----------|
| 1138 | Activated | Monday | 2015-02-24 07:05:00 |
| 1138 | Deactivated | Monday | 2015-02-24 18:15:00 |
| 1138 | Activated | Tuesday | 2015-02-25 07:10:00 |
| 1138 | Deactivated | Tuesday | 2015-02-25 18:30:00 |
| 1138 | Activated | Wednesday | 2015-02-26 07:08:00 |
| 1138 | Deactivated | Wednesday | 2015-02-26 18:20:00 |
| ... | ... | ... | ... |

FIG. 5C

PROVIDING UTILIZATION INFORMATION FOR INTELLIGENT SELECTION OF OPERATING PARAMETERS OF A WIRELESS ACCESS POINT

BACKGROUND

A current popular form of wireless computer networking technology is based on the IEEE 802.11 specification which uses the 2.4, 5, and 60 GHz ISM radio frequency bands— commercially known as "Wi-Fi." These radio frequency bands, however, may be unlicensed thus permitting any device to operate within those radio frequency bands. As a result, devices that transmit and receive radio communications within these frequency bands are prone to interference from other devices operating at the same frequency or within the same radio frequency band.

With the growing popularity of devices with wireless communication capabilities, almost every home, school, office, and business includes at least one wireless access point (WAP) with some having multiple WAPs. In addition, municipalities and network service providers have begun to deploy publically available WAPs to provide wireless communication capabilities in public spaces such as parks, thoroughfares, and the like. As the number of WAPs deployed to a particular area increases, so does the re-use of the limited channels (e.g., frequencies) that are available in the unlicensed frequency bands. The re-use of channels often results in interference caused by multiple WAPs and their corresponding clients transmitting on the same channel concurrently. Such interference is only exacerbated as the number of clients connected to the WAP increases.

Since the density of public and private wireless environments is expected to only increase with the proliferation of wireless devices and WAPs to service those devices, the risk of interference is also expected to increase. Accordingly improved techniques for configuring WAPs are needed to ensure a high quality of service within those crowded wireless environments.

SUMMARY

In some embodiments, a WAP deployed in a wireless environment continually measures its utilization. The WAP obtains measurements of one or more utilization metrics that indicate the extent to which the WAP is being utilized. Utilization metrics may include, for example, a measurement of traffic on the channel utilized by the WAP, a measurement of bandwidth available on that channel, the number of client devices connected to the WAP, the number of packets or frames transmitted by the WAP within a predetermined time period, and a volume of data transmitted by the WAP within a predetermined time period. The WAP may obtain utilization metrics measurements at regular intervals, e.g., every ten minutes.

In some embodiments, the WAP stores the utilization metric measurements obtained in a history of utilization metric measurements. The history of utilization metric measurements may include, for each time period during which utilization of the WAP was measured, a set of utilization metric measurements. Each set of utilization metric measurements may determine the channel utilized by the WAP during the during the measurement period. The WAP may also analyze the history of utilization metric measurements to determine correlations between the one or more operating parameters of the WAP (e.g., the channel utilized) and various timeframes, e.g., times-of-day, days of the week, date ranges, and the like. Additionally or alternatively, the WAP may transmit the history of utilization metric measurements to a centralized server that receives and stores multiple histories of utilization metric measurements respectively received from multiple WAPs. That centralized server may likewise analyze the histories of utilization metric measurements to determine correlations between a utilization metric and various timeframes. As described further below, the centralized server may also take into account information received from other systems, devices, and services that operate within the same wireless environments as a WAP which may suggest the extent to which that WAP is or is expected to be utilized.

The WAP may also be configured to transmit its utilization metric measurements to neighboring WAPs and receive utilization information from neighboring WAPs. As noted above, multiple WAPs may be deployed within the same location such that those WAPs are within transmission range of each other. Those WAPs may thus exchange the utilization metric measurements each respectively obtains in order to further improve selection of their various operating parameters. As explained in further detail below, a WAP may analyze the respective utilization metric measurements it obtains as well as the utilization information received from another WAP and select its operating parameters based on that analysis. As an example, a WAP may receive utilization information from another WAP indicating a relatively high utilization of that WAP on channel number 1 between the hours of 5:00 PM and 8:00 PM. In order to avoid or at least mitigate interference with that other WAP, the WAP may set its operating channel to channel 11 during those hours. Additional examples will be appreciated with the benefit of the additional disclosures provided herein. In some example implementations, the WAP may utilize its beaconing feature to transmit the utilization information to other WAPs. Accordingly at least some of the utilization metric measurements obtained by the WAP may be included in a beacon transmitted into the surrounding wireless environment which, in turn, may be received by neighboring WAPs.

A WAP may also receive status information from systems or devices that operate within the location at which the WAP is deployed. Such systems and devices may include, for example, building security systems and devices, lighting control systems and devices, temperature control systems and devices, energy management systems and devices, and the like. A common feature these types of systems and devices share is that their status may suggest whether the WAP is likely to be utilized. As one example, activation of a building security system may suggest that the building is unoccupied and thus, a WAP that provides wireless services to the occupants of that building is not likely to be utilized. On the other hand, deactivation of the building security system may suggest the building is occupied and thus the WAP is likely to be utilized. Additional examples will be appreciated with the benefit of the additional disclosures set forth herein. A WAP may receive status information from such systems and devices and likewise select one or more of its operating parameters based, at least in part, on such status information. Continuing the example above, the WAP deployed at the building may reduce its transmit power in response to receipt of status information indicating the building security system has been activated. Again additional examples will be appreciated with the benefit of this disclosure.

Based on the utilization metric history obtained and the correlations identified, the WAP may select one or more operating parameters and reconfigure itself to utilize those selected operating parameters. Operating parameters include, for example, a particular radio frequency band and a particular channel to transmit on, a particular transmit power, and a particular wireless networking standard to utilize. The WAP may also select, based on the utilization metric history obtained and correlations identified, a sequence of operating parameters for a sequence of time-frames, i.e., different operating parameters to use at various times throughout the day so as to avoid interference expected in the wireless environment during those time-frames. Additionally or alternatively, the centralized server may transmit to the WAP parameter selection instructions identifying one or more operating parameters to utilize. The centralized server may likewise transmit parameter selection instructions that include sequences of operating parameters to utilize at various times throughout the day.

As noted above, a WAP may select its operating parameters based on its own history of utilization metric measurements, utilization information received from other WAPs, and status information received from remote systems or devices that operate within the location at which the WAP is deployed. It will thus be appreciated with the benefit of this disclosure, that the WAP may select its operating parameters based on various combinations of the information above. For example, a WAP may select its operating parameters i) based solely on its own history of utilization metric measurements and utilization correlations identified therefrom, ii) based solely on utilization information received from other WAPs and utilization correlations identified therefrom, or iii) based solely on status information received from the remote systems or devices and correlations identified therefrom. With respect to the status information received, a WAP, in some example implementations, may select its operating parameters based solely on the status information received without determining any correlations associated with that status information. The WAP may also select its operating parameters based on i) a combination of its own history of utilization metric measurements, utilization information received from other WAPs, and utilization correlations identified therefrom, ii) a combination of its own history of utilization metric measurements, status information received from remote systems or devices, and utilization correlations identified therefrom, iii) a combination of utilization information received from other WAPs, status information received from remote systems or devices, and utilization correlations identified therefrom, or iv) a combination of its own history of utilization metric measurements, utilization information received from other WAPs, status information received from remote systems or devices, and utilization correlations identified therefrom. A WAP control server may likewise select operating parameters for WAPs deployed to a location based on this information and combinations thereof.

Client devices operating within the wireless environment may also receive transmissions from WAPs that include utilization information and determine which WAP to connect to based on an analysis of that utilization information. As an example, a client device operating within a location at which two WAPs are deployed may have the option of which WAP to connect to. The client device may receive a respective transmission from each of the WAPs and determine, based on the utilization information included therein, which WAP has a relatively higher utilization (e.g., a higher amount of bandwidth utilized) and which WAP has a relatively lower utilization (e.g., a lower amount of bandwidth utilized). Based on the utilization information received, the client device may connect to the WAP having the relatively lower utilization. If both WAPs, in this example, have about the same utilization (or if the difference in utilization not enough to result in a different quality of service), the client device may connect to either WAP. Various schemes may be selectively employed to determine which WAP to connect to when the difference in utilization is negligible, e.g., connect to a WAP at random, connect to the WAP where the signal strength is higher, etc. Accordingly, client devices may be configured with WAP connection protocols that take into account the utilization information transmitted by the various WAPs it has the option of connecting to. Other examples of determining which WAP a client should connect to will likewise be appreciated with the benefit of the additional disclosures set forth herein.

This summary is not intended to identify critical or essential features of the disclosures herein, but instead merely summarizes certain features and variations thereof. Other details and features will also be described in the sections that follow.

BRIEF DESCRIPTION OF THE DRAWINGS

Some features herein are illustrated by way of example, and not by way of limitation, in the figures of the accompanying drawings and in which like reference numerals refer to similar elements.

FIG. 5A illustrates an example of an implementation of a history of utilization metric measurements obtained by a wireless access point in accordance with aspects described herein.

FIG. 5B illustrates an example of an implementation of utilization information transmitted by a neighboring wireless access point in accordance with aspects described herein.

FIG. 5C illustrates an example of an implementation of status information transmitted by a remote system or device in accordance with aspects described herein.

DETAILED DESCRIPTION

Figure 1A:
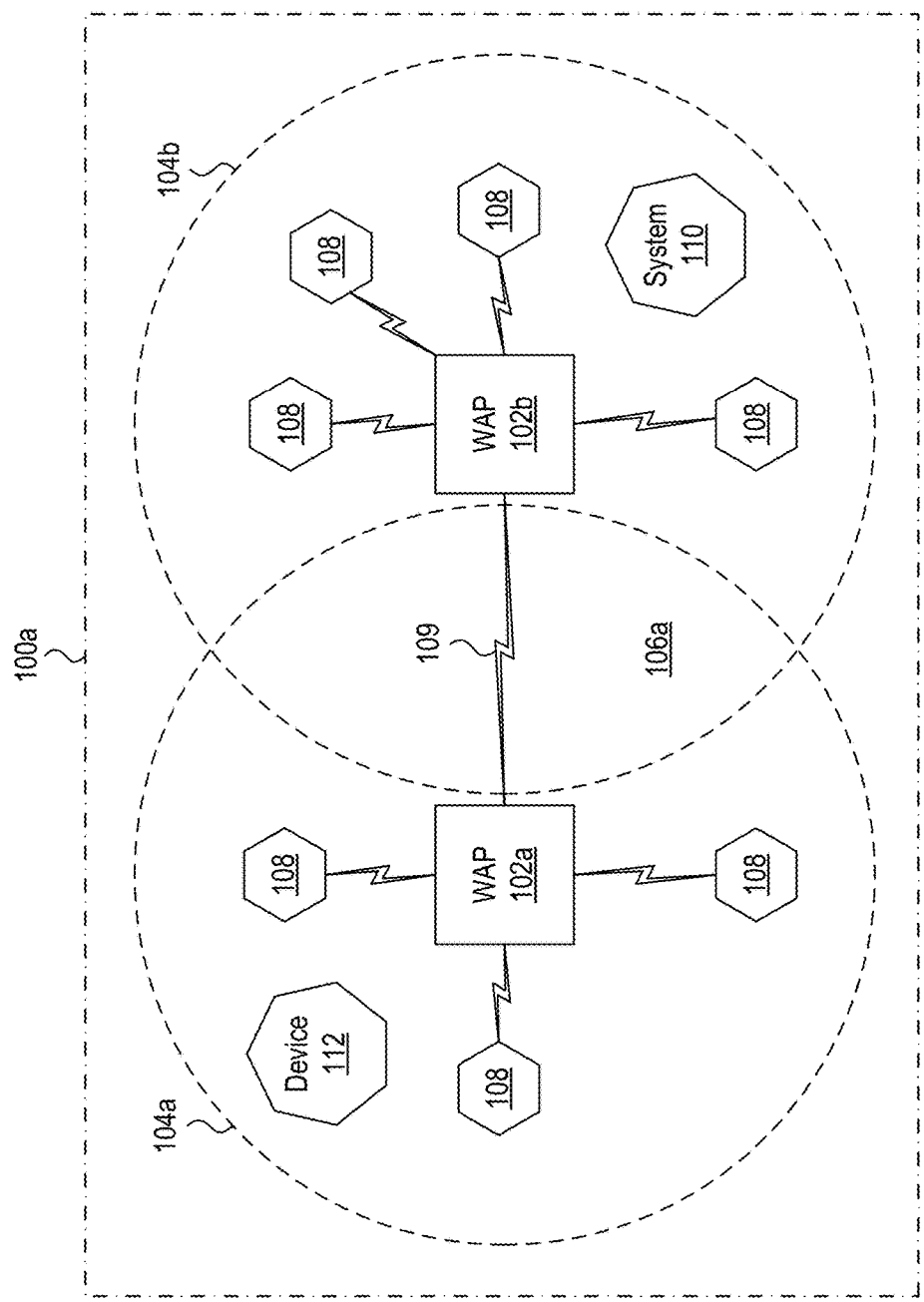
FIG. 1A illustrates an example wireless environment in which multiple wireless access points have been deployed in accordance with aspects described herein.

Aspects described herein relate to intelligently configuring wireless access points (WAPs) to mitigate interference among neighboring WAPs as their utilization fluctuates. The techniques described below are described, by way of example, in the context of the Wi-Fi family of wireless networking technologies—i.e., the IEEE the 802.11x family of wireless networking technologies. The techniques described below, however, may be employed with any wireless networking technology in which a set of frequencies are shared among wireless devices.

As noted above, the techniques described below may be employed in wireless environments where devices utilize the IEEE 802.11x family of wireless networking technologies which may operate in the 2.4, 5, and 60 GHz radio frequency bands ("Wi-Fi" and "WiGig") and in the 54-790 MHz frequency radio bands of the VHF and UHF white space spectrum ("Super Wi-Fi"). The techniques described below may also be employed in wireless environments where devices utilize the IEEE 802.16x family of wireless networking technologies ("WiMAX") which may operate in the 10-66 GHz radio frequency bands. Although the techniques described herein are referred to in the context of unlicensed frequency bands, it should be understood that such techniques may also be employed in wireless environments where devices utilizes licensed frequency bands, e.g., the 3.6 GHz frequency band.

By way of example, a WAP may be configured to operate in the 2.4 GHz frequency band which extends between 2.4 GHz and 2.5 GHz and is divided into fourteen total channels spaced 5 MHz apart and numbered from channel 1 to channel 14. The WAP may thus be configured to utilize one of those channels as its operating channel. Due to regulations, one or more of the channels may not be available in some jurisdictions. Other frequency bands may be similarly divided into multiple channels.

To mitigate the effects of interference in a wireless environment in which multiple WAPs are deployed, techniques may utilize historic measurements of utilization metrics to select operating parameters for the WAPs. As described in further detail below, a WAP continually measures its utilization and stores the measurements obtained to build a history of utilization metric measurements. The WAP analyzes that utilization metric history to determine correlations in utilizations (e.g., patterns and/or trends) across various time periods. Based on the analysis of the utilization metric history, the WAP is thus equipped to make intelligent decisions with respect to the channel, frequency band, and/or other operating parameters it utilizes to exchange wireless communications with client devices.

As a practical example, a municipality or network service provider may deploy multiple WAPs to provide wireless networking capabilities across an entire geographic area such as a public park. To ensure blanket coverage, WAPs may be deployed such that their wireless range overlaps. Since overlapping wireless ranges introduces the potential for interference, however, the WAPs may again continually measure their respective utilizations to obtain respective histories of utilization metric measurements. Those histories of utilization metric measurements may be analyzed to determine patterns and/or trends in utilization within the public area, e.g., that utilization is relatively higher during lunch hours, during the evening, and on weekends. Based on these patterns and/or trends, the WAPs may select their respective operating parameters (e.g., operating channel) to mitigate interference. For example, neighboring WAPs having overlapping wireless ranges may each respectively select non-overlapping channels. As described in further detail below, the WAPs deployed by a particular network service provider may each be connected to a centralized WAP control server and transmit their respective channel metric histories to the WAP control server for storage and analysis. The WAP control server may then issue instructions to a WAP identifying one or more operating parameters to use, e.g., a particular channel to set as the operating channel. Additional examples will be appreciated with the benefit of this disclosure.

The techniques described herein may also be adopted as standard features for WAPs in order to improve operation of WAPs that may be manufactured by different manufacturers. The unlicensed nature of Wi-Fi means that multiple service providers may deploy WAPs having different manufacturers and thus different specifications and features at the same location. A form of self-governance among WAPs of different service provides and different manufacturers advantageously results when the operating parameters and corresponding utilization of those WAPs are broadcast throughout the wireless environment. In other words, while any one service provider or WAP might not be able to claim exclusive use of the unlicensed frequency band, all service providers and WAPs can benefit by sharing their historic utilization metric measurements which allows for more intelligent selection of operating parameters so as to avoid or at least mitigate interference among the WAPs. As a result, the wireless services provided by each of the WAPs and service providers is advantageously improved.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging. In addition a "set" as used in this description refers to a collection of one or more elements. Furthermore non-transitory computer-readable media refer to all types of computer-readable media with the sole exception being a transitory propagating signal.

Referring now to FIG. 1, an example wireless environment 100a in which multiple wireless access points (WAPs) 102a and 102b (collectively 102a-b) have been deployed is shown. As noted above, the wireless environment 100a may be a public or private space. As seen in FIG. 1, WAP 102a is respectively associated with a wireless range 104a and WAP 102b is respectively associated with a wireless range 104b that overlap with each other resulting in a region 106a of overlap of the wireless ranges. Client devices 108 may be located within the wireless environment 100a and in signal communication with one of the WAPs 102a-b. The WAPs 102a-b may provide the client devices 108 with network access, e.g., access to a local area network (LAN), a wide area network (WAN) such as the Internet, and/or a content delivery network.

Client devices may be any type of computing device configured for wireless networking Examples of client devices include desktop computing devices, laptop computing devices, tablet computing devices, hand-held computing devices, servers, gateways, data storage devices, mobile cellular telephones, video game machines, televisions, digital video recorders, set-top boxes, in-vehicle devices (e.g., vehicle monitoring devices, navigation devices, point-of-interest devices), wearable computing devices (e.g., watches, retinal displays, head-mounted displays), robots, "smart" devices and appliances, and network-enabled objects that form part of the "Internet of Things."

As also seen in FIG. 1, the WAPs 102a-b are in wireless signal communication with each other and thus capable of transmitting and receiving transmissions 109 from each other. The WAPs 102a-b are configured to obtain utilization metric measurements based on the services provided to the client devices 108 and transmit that utilization information to the other WAP in the transmissions 109. The WAPs 102a-b may thus analyze the utilization metric measurements obtained and the utilization information received in order to intelligently select their respective operating parameters. In this way, the WAPs 102a-b advantageously mitigate interference and thus mitigate degradation of the wireless signals exchanged with the client devices 108. By mitigating interference and mitigating degradation of the wireless signals, aspects of the wireless services the WAPs 102a-b provide to client devices 108 are advantageously improved, e.g., lower latency, higher throughput, less packet loss, fewer collisions.

In some scenarios, each of the WAPs 102a-b may be deployed by the same entity, e.g., the same service provider such as a network service provider and/or content service provider. In these scenarios the service provider may control the configuration of the WAPs 102a-b to minimize interference between neighboring WAPs. Given the unlicensed nature of some wireless communication technologies, however, it will be recognized that other service providers may deploy their own WAPs 102a-b within the wireless environment 100a thus introducing potential sources of interference. Since a service provider is unlikely to have control over the WAPs deployed by another service provider, other strategies are needed to minimize, or at least mitigate, those potential sources of interference. The intelligent channel selection techniques described herein may be implemented to that effect.

As also seen in FIG. 1A, a system 110 and a device 112 is deployed within the wireless environment 100a. The system 110 and the device 112 may be such that their status is indicative of or suggests a likelihood that the WAPs 102a or 102b is or will be utilized. Such types of systems may include, for example, building security systems (e.g., home, business, or office), temperature control systems, lighting control systems, energy management systems, and other types of systems that suggest the likelihood of utilization of the WAP 102a or 102b. Such types of devices may thus include, for example, security cameras, motion sensors, audio sensors, door locks, thermostats, lighting elements, and other types of devices the status of which may indicate whether a user is present within the wireless environment and thus potentially utilize the wireless services of the WAP. Accordingly, a WAP may be configured, for example, based on a thermostat setting of a temperature control system (e.g., ON/OFF, a particular temperature setting, a temperature setting schedule), based on sensor readings and/or the status of a security system (e.g., activated/deactivated, audio detected, motion detected), based a setting of a door lock or lighting element (e.g., ON/OFF), based on an energy consumption reading of an energy management system (e.g., kilowatt-hours—kWh), and the like.

Figure 1B:
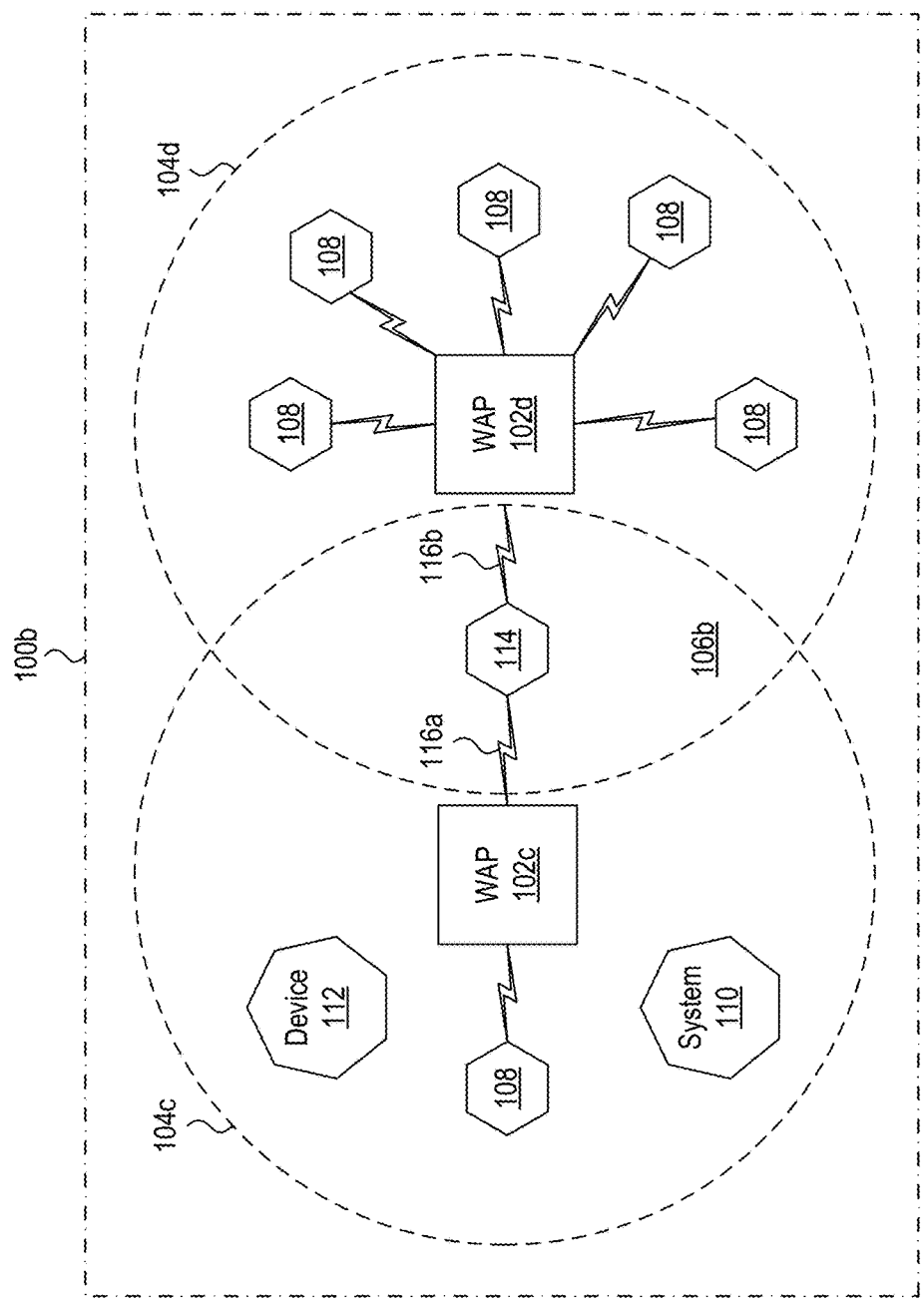
FIG. 1B illustrates another example wireless environment in which multiple wireless access points have been deployed in accordance with aspects described herein.

With reference to FIG. 1B, another example wireless environment 100b in which multiple WAPs 102c and 102d (collectively 102c-d) are deployed to provide wireless services to client devices 108 within the wireless environment is shown. The WAP 102c is similarly associated with a wireless range 104c, and the WAP 102d is similarly associated with a wireless range 104d. The wireless ranges 104c and 104d likewise overlap with one another to provide a region 106b of overlap. In this example wireless environment 100b, a client device 114 is located within the region 106b of overlap of the wireless ranges 104a-b and thus capable of receiving transmissions from each of the WAPs 102c-d, e.g., a transmission 116a from WAP 102c and a transmission 116b from WAP 102d. The client device 114 thus has the option of which WAP 102c or WAP 102d to connect to. The transmissions 116a-b may respectively include utilization information describing the utilization of the respective WAPs 102c-d. Based on that utilization information, the client device 114 may select one of the WAPs 102c-d to connect to and utilize the wireless services it provides.

Utilization information, as used herein, refers to information that describes utilization of a wireless access point. Utilization information may include, for example, a measurement of a utilization metric as well as a set of measurements of multiple utilization metric measurements for one or more utilization metrics. Utilization information may also include information associated with the measurement of a utilization metric such as, for example, a timestamp at which the measurement was obtained (e.g., 2016-02-24 6:11:00 AM) as well as one or more operating parameters set at the WAP when the measurement was obtained. Utilization information may include a history of utilization metric measurements, i.e., a sequence of successive sets of utilization metric measurements. As described in further detail below, a WAP may be configured to determine, based on the history of utilization metric measurements, correlations between a utilization metric and various time periods. Accordingly the WAP may thus also be configured to determine, based on those correlations, whether utilization of the WAP during a subsequent time period is expected to increase, decrease, or stay the same. Utilization information may thus also include correlations identified through an analysis of the utilization metric measurements between one or more utilization metrics and various time periods. Utilization correlations may include, for example, information indicating an expected utilization for a subsequent time period. The information indicating an expected utilization may thus include qualitative information, e.g., the expected utilization is expected to be higher or lower relative to a current utilization. The information indicating an expected utilization may, additionally or alternatively, include quantitative information, e.g., an average of the utilization metric for the subsequent time period as determined from the historic utilization metric measurements for that time period. The information indicating an expected utilization may also include both qualitative and quantitative information, e.g., a percentage likelihood that the utilization will be "higher" or "lower" relative to a current utilization.

Utilization metrics refer to measurable parameters that indicate to what extent a WAP is being utilized. Examples of utilization metrics include a measurement of traffic on the channel utilized by the WAP, a measurement of bandwidth available on that channel, the number of client devices connected to the WAP, the number of packets or frames transmitted by the WAP within a predetermined time period, a volume of data (e.g., bytes) transmitted by the WAP within a predetermined time period, a noise floor, and the like. A WAP may be configured to measure one or more of these metrics at periodic intervals, e.g., every fifteen minutes, every half-hour, every hour, and so forth. In addition, the WAP may calculate, store, and transmit various statistical values associated with the utilization metric measurements obtained including, for example, a maximum for a utilization metric, a minimum for the utilization metric, and one or more measures of central tendency, e.g., arithmetic mean, median, mode, and the like. Furthermore a WAP may calculate, store, and transmits such statistical values for various time periods, e.g., statistical values for every one hour, every four hours, every eight hours, every twelve hours, every twenty-four hours, and the like. The WAP may also be configured such that the utilization metrics measured, the duration between measurement periods, the statistical values calculated, and the duration between transmissions are configurable parameters at the WAP. Examples of WAP operating parameters include a radio frequency band utilized by the WAP (e.g., 2.4 GHz or 5 GHz), a channel within the radio frequency band utilized by the WAP (e.g., channel 1 or channel 11), a wireless networking standard for the wireless access point (e.g., 802.11b or 802.11g), a transmit power of the WAP (e.g., 5 mW or 10 dBm), and a channel bandwidth.

The client device 114, in this example, is configured to analyze the utilization information received in the transmissions 116*a*-*b* to determine which of the WAPs 102*c* or 102*d* to connect to. In some example implementations, the client device 114 may be configured to connect to the WAP that is currently less utilized. The WAP 102*d*, in this example, is shown in FIG. 1B to be connected to a total of five client devices 108 while the WAP 102*c* is shown to be connected to only one client device 108. The utilization information included in the respective transmissions 116*a*-*b* received by the client device 114 may indicate this utilization information, and the client device may determine the WAP 102*c* is less utilized since it has fewer clients connected to it compared to the WAP 102*d*.

It will also be appreciated that the amount of bandwidth utilized by the WAP may, in addition to or as an alternative of the number of connected client devices, provide a useful indication of the utilization of the WAP. For example, a WAP connected to only one client device may be determined to have a higher utilization when that client device demands a larger percentage of the available bandwidth as compared to another WAP connected to multiple clients that collectively demand a smaller percentage of the available bandwidth. As noted above, the utilization information received at a client from a WAP may also include an indication of whether the utilization is expected to increase or decrease for a subsequent time period. Accordingly the client device may be configured to take into account an expected utilization for a WAP during upcoming time periods when the client device has the option of connecting to multiple WAPs. For example, a client device may receive utilization information from a WAP that indicates a relatively higher current utilization but a relatively lower expected utilization for a subsequent time period. The client device may therefore determine to connect to this WAP in favor of another WAP providing utilization information indicating a relatively lower current utilization but a relatively higher expected utilization for the same subsequent time period. Where the difference in utilization between multiple WAPs is negligible, a client device may, in some example implementations, select one of the WAPs to connect to at random. Other examples and techniques for selecting which one of multiple WAPs to connect to will be appreciated with the benefit of this disclosure.

Figure 2A:
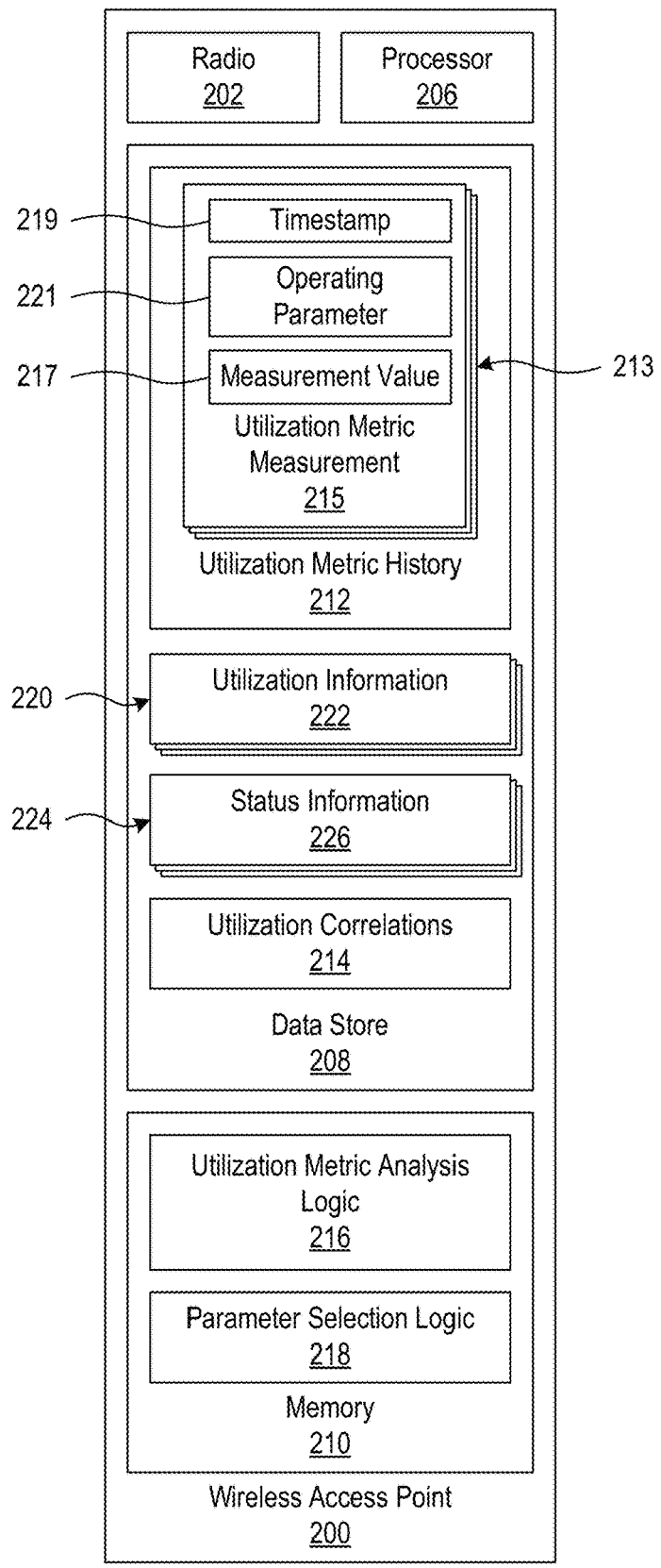
FIG. 2A illustrates a block diagram of an example of an implementation of a wireless access point in accordance with aspects described herein.

Referring now to FIG. 2A, a block diagram of an example of an implementation of a wireless access point (WAP) 200 configured for intelligent selection of its operating parameters is shown. The WAP 200, in this example, is configured to periodically measure its utilization, store utilization metric measurements as a utilization metric history, analyze the utilization metric history to determine correlations between the utilization metrics measured and various timeframes, and select one or more operating parameters based on those correlations.

The WAP 200, in this example, includes a radio 202, a processor 206, a data store 208, and memory 210. The data store 208 stores the utilization metric history 212 corresponding to a set 213 of utilization metric measurements 215 obtained by the WAP 200 and stores the utilization metric correlations 214 identified from the analysis of the utilization metric history. The WAP 200 is programmed with instructions that, when executed by the processor 206, cause the WAP 200 to perform various actions associated with intelligent selection of its operating parameters. Accordingly, the memory 210 stores utilization metric analysis logic 216 corresponding to a set of instructions for analyzing the utilization metric history 212 and stores parameter selection logic 218 corresponding to a set of instructions for selecting a value for one or more operating parameters of the WAP 200 based on the analysis of the utilization metric history 212.

The utilization metric measurement 215, in FIG. 2A, includes a measurement value 217 for a measured utilization metric, a timestamp 219 indicating a date and time the WAP 200 measured the utilization metric (e.g., a bandwidth utilization measurement), and an indication 221 of the operating parameter utilized by the WAP (e.g., the operating channel) when measuring the utilization metric. Although the utilization metric measurement 215 is shown with only one indication 221 of an operating parameter, the utilization metric measurement may include multiple indications of the operating parameters utilized by the WAP (e.g., the operating channel and the transmit power) when measuring the utilization metric. In addition, although the utilization metric measurement 215 is shown with only one measurement value 217 for a measured utilization metric, the utilization metric measurement may similarly include multiple respective measurement values for multiple utilization metrics (e.g., a bandwidth utilization measurement and a number of connected client devices) measured by the WAP 200.

The data store 208 of the WAP 200, in this example, also stores a set 220 of utilization information 222 received from neighboring WAPs in the wireless environment at which the WAP is deployed. The data store 208 of the WAP 200, in this example, also stores a set 224 of status information received from systems or devices operating within the wireless environment at which the WAP is deployed. When storing utilization information 222 received from a neighboring WAP or storing status information 226 received from a remote system or device, the WAP 200 may, in some example implementations, replace previous utilization information or status information previously received from that neighboring WAP or from that remote system or device, e.g., such that the WAP only stores the most recent utilization information or status information received from the neighboring WAP or remote system or device. In other example implementations, the WAP may store multiple sets of utilization information or status information (e.g., the previous five sets of information) received from a particular neighboring WAP or remote system or device.

The radio 202 may include a corresponding receiver, transmitter, and antenna. In some example implementations, the radio 202 may include multiple antennas for sending and receiving multiple data streams simultaneously, e.g., in multiple-input multiple-output (MIMO) implementation. The radio 202 may be configured to operate within a particular radio frequency band, e.g., the 2.4 GHz radio frequency band or the 5 GHz frequency band. Although only one radio 202 is shown in FIG. 2A, the WAP 200 as well as other implementations of the WAP may include multiple radios, e.g., at least one 2.4 GHz radio and at least one 5 GHz radio. Similarly the WAP 200 and other implementations of the WAP may include multiple processors 206.

The utilization metric analysis logic 216 may determine the correlations between utilization of the WAP and various timeframes and provide the correlations identified to the data store 208 for storage as the utilization metric correlations 214. The utilization metric correlations 214 identified may include both linear and non-linear correlations between the various the utilization metrics measured and various timeframes, and a metric may be positively or negatively correlated with a particular timeframe. The utilization metric correlations 214 identified may also include correlations where there is no statistically significant relationship between the utilization metric and the timeframe, i.e., a utilization metric correlation may indicate that there is no appreciable correlation between utilization of the WAP and the particular timeframe. Analyzing the utilization metric measurements may include obtaining an average of the utilization metric measurements obtained during a particular timeframe and comparing that average to a utilization metric measurement threshold or an average of utilization metric measurements obtained for another timeframe. As one example, analyzing the utilization metric measurements may include determining whether an average utilization metric measurement for a previous timeframe crossed a metric measurement threshold—e.g., whether an average bandwidth utilization of the WAP 200 during a previous time period exceeded 80% or was less than 80%. An another example, analyzing the utilization metric measurements may include comparing averages of utilization metric measurements for respective timeframes to determine whether those averages differ by more than a predetermined amount—e.g., whether the average number of clients connected to the WAP between 4:30 AM-8:30 AM differs from the average number of clients connected to the WAP between 8:30 AM-5:30 PM by more than five total client devices. It should be recognized that the time periods discussed herein are provided by way of example only. In some example implementations, the time periods may be configurable parameters. In other example implementations a WAP or a WAP control server may be configured to determine the time periods of relatively high utilization by determining that the utilization metric measurements have increased beyond a predetermined increase threshold within a predetermined time period and have decreased beyond a predetermined decrease threshold within a predetermined time period, e.g., an increase or decrease of the utilization metric measurements by more than 50% within a one hour period. As a particular example, based on one week's worth of utilization metric measurements, a WAP or WAP control server may observe a 60% average increase in the number of wireless devices utilizing the WAP between 4:00 AM and 5:00 AM and observe a 60% average decrease in the number of wireless devices utilizing the WAP between 8:00 AM and 9:00 AM. Based on these observations, the WAP or WAP control server may define a time period of 4:30 AM-8:30 AM. Additional examples will be appreciated with the benefit of this disclosure.

The WAP 200, in this example, is configured to measure its utilization and update its utilization metric history 212 intermittently, periodically, or at regular or irregular intervals. The WAP 200 may also be configured to measure its utilization in response to receipt of an instruction from another device that is in wired or wireless signal communication with the WAP located either locally or remotely relative to the WAP, e.g., a WAP control server. The utilization metric analysis logic 216, in turn, analyzes the new utilization metric measurements obtained and updates (or replaces) the utilization metric correlations 214 based on the analyses of the new utilization metric measurements. The WAP 200 may measure its utilization at regular intervals, e.g., every 10 minutes. The utilization metric analysis logic 216 may perform an analysis of the utilization metric history 212 after each measurement period or at a different regular interval, e.g., once a day. If storage space is limited at the data store 208, the WAP 200 may delete utilization metric measurements more than x days old (e.g., 7 days) to free up storage space for new utilization metric measurements. This continual process of measuring the utilization of the WAP 200, updating the utilization metric history 212, and updating the utilization metric correlations 214 advantageously allows the WAP to adapt to changes in the patterns and trends of utilization.

The WAP 200, in this example, is also configured to transmit the utilization information it obtains to neighboring WAPs. The utilization information transmitted to the neighboring WAPs may include the utilization metric history 212 itself or a portion of the utilization metric history, e.g., one or more of the utilization metric measurements 215 included in the utilization metric history. As an example, the WAP 200 may be configured to transmit the utilization metric measurement 215 obtained for the most recent measurement period (e.g., the previous ten minutes). As another example, the WAP 200 may be configured to transmit the utilization metric measurements 215 obtained for the previous x number of measurement periods (e.g., the previous 5 measurement periods). The WAP 200 may be configured to transmit utilization information periodically at regular intervals (e.g., every ten minutes), in response to obtaining new utilization metric measurements, or in response to determining new utilization correlations. The WAP 200 may also be configured to transmit utilization information in response to an explicit request from, e.g., a neighboring WAP, a WAP control server, or some other system or device in direct or indirect signal communication with the WAP. In some example implementations, the WAP may be equipped with a beaconing feature and employ this beaconing feature to transmit the utilization information in a beacon. Using beacons to transmit utilization information will be discussed in further detail below.

The parameter selection logic 218, in this example, selects values for one or more operating parameters of the WAP 200 based on the utilization metric correlations 214 identified. The primary operating parameter selected for the WAP 200 based on the utilization metric correlations 214 is the operating channel of the WAP. Accordingly the parameter selection logic 218 determines whether there is a better channel to utilize as the operating channel based on the utilization metric correlations and, if so, instructs the WAP 200 to switch its operating channel to that channel. The parameter selection logic 218 may determine whether to switch to a different channel, e.g., whenever the utilization metric correlations 214 are updated or at a regular interval (e.g., eight hours).

The parameter selection logic 218 may also determine to switch to a different channel in response to determining that a utilization metric measurement 215 obtained for its current operating channel has crossed a metric measurement threshold (i.e., dropped below the metric measurement threshold or exceeded the measurement metric threshold). The parameter selection logic 218 may also determine whether to switch to a different channel based on a comparison of multiple channel metric measurements to respective metric measurement thresholds.

In addition to the operating channel, other operating parameters may be selected based on the utilization metric correlations 214 in order to improve the performance of the WAP in the surrounding wireless environment. Other operating parameters that may be selected based on the utilization metric correlations 214 include the radio frequency band utilized by the WAP, the wireless networking standard utilized by the WAP, and the transmit power of the WAP. As an example, the WAP 200 may switch from the 2.4 GHz radio frequency band to the 5 GHz radio frequency band based on the utilization metric correlations 214 identified. An another example, the WAP 200 may switch from the 802.11b wireless networking standard to the 802.11g wireless networking standard based on the utilization metric correlations 214 identified.

In addition, an activation status of a WAP may be toggled based on utilization metric correlations. As an example, one or more inactive WAPs deployed in a wireless environment may be activated and deactivated based on utilization metric correlations that indicate relatively more or less demand for wireless services at various times. As an example, the utilization metric correlations may indicate that demand for wireless services decreases during the evening and nighttime hours and increases during the morning and daytime hours. Accordingly, one or more WAPs may deactivate around the time the utilization metric correlations indicate demand for wireless services is expected to decrease, and one or more WAPs may activate around the time the utilization metric correlations indicate demand for wireless services is expected to increase. A WAP itself may determine whether to activate or deactivate based on the utilization metric correlations or, additionally or alternatively, a WAP may receive an instruction to activate or deactivate, e.g., from a centralized WAP control server. Furthermore, a WAP may generate or receive a sequence of timeframes during which the WAP should be active or inactive (e.g., active from 6:00 AM to 11:59 PM and inactive from 12:00 AM to 5:59 AM) and thus activate and deactivate according to that sequence.

Furthermore the parameter selection logic 218 may select a sequence of operating parameters for a sequence of consecutive timeframes based on the utilization metric correlations identified. A timeframe may be defined by one or more of a time-of-day (e.g., between 5:30 AM and 7:30 AM), a day of the week (e.g., Saturday and Sunday), and a date range (e.g., between May 22 and August 27). In this way the parameter selection logic 218 may preemptively change the operating parameters of the WAP 200 based on the utilization metric correlations 214 identified. The parameter selection logic 218 may change an operating parameter prior to a subsequent timeframe, at the start of the subsequent timeframe, or during the subsequent timeframe. In some example implementations, even though the utilization metric correlations 214 indicate the WAP 200 could be using a better operating channel, the parameter selection logic 218 may not change an operating parameter of the WAP unless a utilization metric measurement for its current operating channel has crossed a metric measurement threshold. In these example implementations, the WAP 200 advantageously avoids unnecessary reconfigurations of its operating parameters and thus unnecessary disruptions to the wireless services provided to its client devices.

The parameter selection logic 218 may select one or more operating parameters based, in addition or as an alternative to the utilization metric correlations 214, the utilization information 222 received from one or more neighboring WAPs and/or the status information 226 received from one or more remote systems or devices. As an example, the WAP 200 may receive a transmission from a neighboring WAP indicating that the bandwidth utilization of the neighboring WAP operating on a first channel is x %. In response to receipt of this transmission, the WAP 200 may determine that bandwidth utilization exceeds a bandwidth utilization threshold of y %, select a second operating channel for the WAP, and instruct the WAP to set the selected channel as its current operating channel in order to mitigate interference with the neighboring WAP. As another example, the WAP 200 may receive status information indicating an activation of security system deployed with the location of the WAP. As noted above, the WAP may be configured to interpret activation of a security system as an indication that the WAP is less likely to be utilized. Accordingly, in response to receipt of the status information, the WAP may, e.g., reduce its transmit power or deactivate completely. Additional examples will be appreciated with the benefit of this disclosure.

Figure 2B:
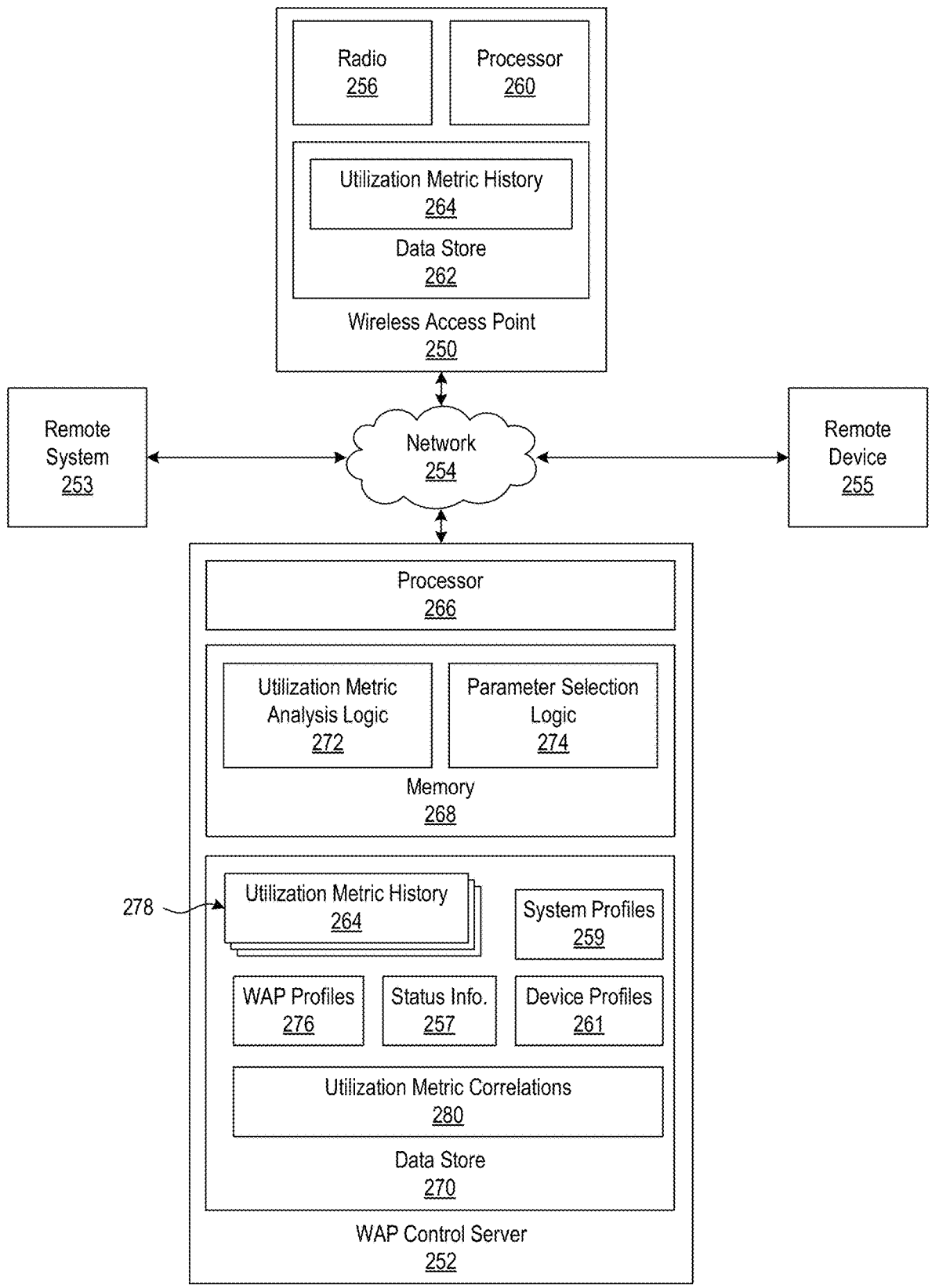
FIG. 2B illustrates a block diagram of another example of an implementation of a wireless access point and an example of an implementation of a wireless access point control server in accordance with aspects described herein.

Referring now to FIG. 2B, a block diagram of another example of an implementation of a wireless access point (WAP) 250 configured for intelligent selection of operating parameters is shown. Like the WAP 200 discussed above with reference to FIG. 2A, the WAP 250 in FIG. 2B is configured to periodically measure its utilization and store utilization metric measurements as a utilization metric history. In contrast to the WAP 200 of FIG. 2A, the WAP 250 of FIG. 2B does not analyze utilization channel metric history to determine utilization metric correlations and select an operating parameter based on those correlations. Instead the WAP 250 is in signal communication with a WAP control server 252 via a network 254 and transmits its utilization metric history to the WAP control server. The WAP control server 252 may be in signal communication with multiple WAPs via the network 254 and may thus coordinate the configuration of those WAPs to minimize interference between those WAPs. Based on the connection of the WAP control server 252 to the WAP 250 via the network 254, the WAP control server may be described as located remotely relative to the WAP.

The WAP control server 252 may be maintained by a service provider (e.g., a network service provider) that has deployed those WAPs throughout a geographic area in order to provide wireless networking capabilities across that geographic area. In some implementations, the WAP control server 252 may be in signal communication with dozens, hundreds, thousands, or even millions of WAPs deployed across one or more geographic areas. A service provider may also maintain a WAP control server 252 for each geographic area in which WAPs have been deployed such that each WAP control server manages the configuration of the WAPs deployed in its respective geographic region. A geographic region may be defined in various way including coordinates of a geographic coordinate system (e.g., latitude/longitude), street boundaries (e.g., northern, southern, eastern, and western streets), zip code boundaries, municipal boundaries (e.g., county/city/state boundaries), and the like. These techniques may be similarly employed for other types of regions and/or areas that are smaller in scale, such as office building, commercial buildings, residential buildings, and the like.

Like the WAP 200 of FIG. 2A, the WAP 250 shown by way of example in FIG. 2B includes a radio 256, a processor 260, and a data store 262. The radio 256 and the processor 260 may be, respectively, the same as or at least similar to the radio 202 and the processor 206 described above with reference to FIG. 2A. In some example implementations of the WAP 250, the radio 256 may include multiple antennas, and the WAP may include multiple radios. The WAP 250 may also include multiple processors 260 in some example implementations.

The WAP 250 likewise periodically measures its utilization to collect utilization metric measurements. The WAP 250 likewise adds the utilization metric measurements obtained to a utilization metric history 264 stored at the data store 262 of the WAP 250. The WAP 250 may collect one or more of the same type of utilization metrics discussed above.

The WAP control server 252 is a computing device programmed with instructions for receiving the utilization metric histories from multiple WAPs, analyzing those utilization metric histories to determine correlations between WAP utilization and various timeframes, and selecting one or more operating parameters for one or more of the WAPs in signal communication with the WAP control server. The WAP control server 252 is also programmed with instructions for receiving status information 257 from one or more remote systems 253 and/or one or more remote devices 255 that are in signal communication with the WAP control server 252 via the network 254. The WAP control server 252 may also determine utilization correlations based on the status information 257 received, e.g., from the remote system 253 and/or the remote device 255. Accordingly, the WAP control server 252, in this example, includes a processor 266, memory 268, and a data store 270. The memory 268 stores utilization metric analysis logic 272 and parameter selection logic 274. The data store 270 stores WAP profiles 276 for each WAP the WAP control server 252 is in signal communication with, a set 278 of individual utilization metric histories 264 received from various WAPs such as WAP 250, and utilization metric correlations 280 identified from an analysis of the utilization metric histories 264 and/or the status information 257.

Each WAP profile 276 is associated with one of the WAPs in signal communication with the WAP control server 252, e.g., WAP 250. A WAP profile 276 may include, for example, a unique identifier for the WAP (e.g., a MAC address of the WAP) and a location identifier indicating the location (or geographic region) in which the WAP is deployed. In addition, a WAP profile 276 may determine a date and time at which the WAP control server 252 most recently received a utilization metric history from the WAP associated with that WAP profile. In some example implementations, a WAP profile 276 may determine the other WAPs within wireless range of the WAP. In other example implementations, the WAP control server 252 may determine the WAPs in wireless range of each other based on the respective location identifiers of the WAP profiles 276. In this way, the WAP control server 252 may coordinate the configuration of the WAPs that are in signal communication with each other.

Each utilization metric history 264 may be associated with one of the WAP profiles, e.g., by also including the unique identifier of the WAP that generated the channel metric history.

The data store 270, in this example, also stores system profiles 259 and device profiles 261 respectively associated with the remote systems and devices the WAP control server 252 is in signal communication with. The system profiles 259 and the device profiles 261 may store information similar to that of the WAP profiles 276, e.g., a unique identifier for the remote system or device, a location identifier indicating the location within which the remote system or device operates, a date and time at which the WAP control sever 252 most recently received status information from the remote system or device, and indications of other WAPs that operate within the same location as the remote system or device.

The utilization metric analysis logic 272 in FIG. 2B is similar to the utilization metric analysis logic 216 of FIG. 2A in that it identifies correlations between utilization metrics and various timeframes. The utilization metric analysis logic 272, however, may determine correlations with respect to utilization metrics based on an analysis of multiple utilization metric histories 264. As an example, the utilization metric analysis logic 272 may analyze multiple utilization metric histories 264 that are each associated with a common geographic region and determine one or more correlations for that geographic region. Accordingly, each utilization metric correlation 280 may determine the particular geographic region the utilization metric correlation has been identified for. The utilization metric correlations 280 may likewise determine a correlation between a utilization metric and a timeframe. As noted above the utilization metric analysis logic 272 may also determine the utilization metric correlations based, additionally or alternatively, on the status information 257 received from, e.g., the remote system 253 or the remote device 255.

The parameter selection logic 274 in FIG. 2B is likewise similar to the parameter selection logic 218 of FIG. 2A in that it selects a value for one or more operating parameters of a WAP such as WAP 250. The parameter selection logic 274, however, may select values for the operating parameters of multiple WAPs and coordinate those selections for WAPs within the same geographic region. The parameter selection logic 274 may similarly select a value for an operating parameter of a WAP for a single timeframe or a sequence of operating parameter values for a sequence of consecutive timeframes. The parameter selection logic 274 may also similarly select values for multiple operating parameters, e.g., an operating channel, a radio frequency band, and a wireless networking standard. Having selected values for one or more operating parameters of the WAP 250, the WAP control server 252 may issue to that WAP instructions having the selected values. In other example implementations, the WAP control server 252 may only provide to a WAP the correlations it identifies, and the WAP may select its operating parameters based on the correlations received from the WAP control server.

Figure 3:
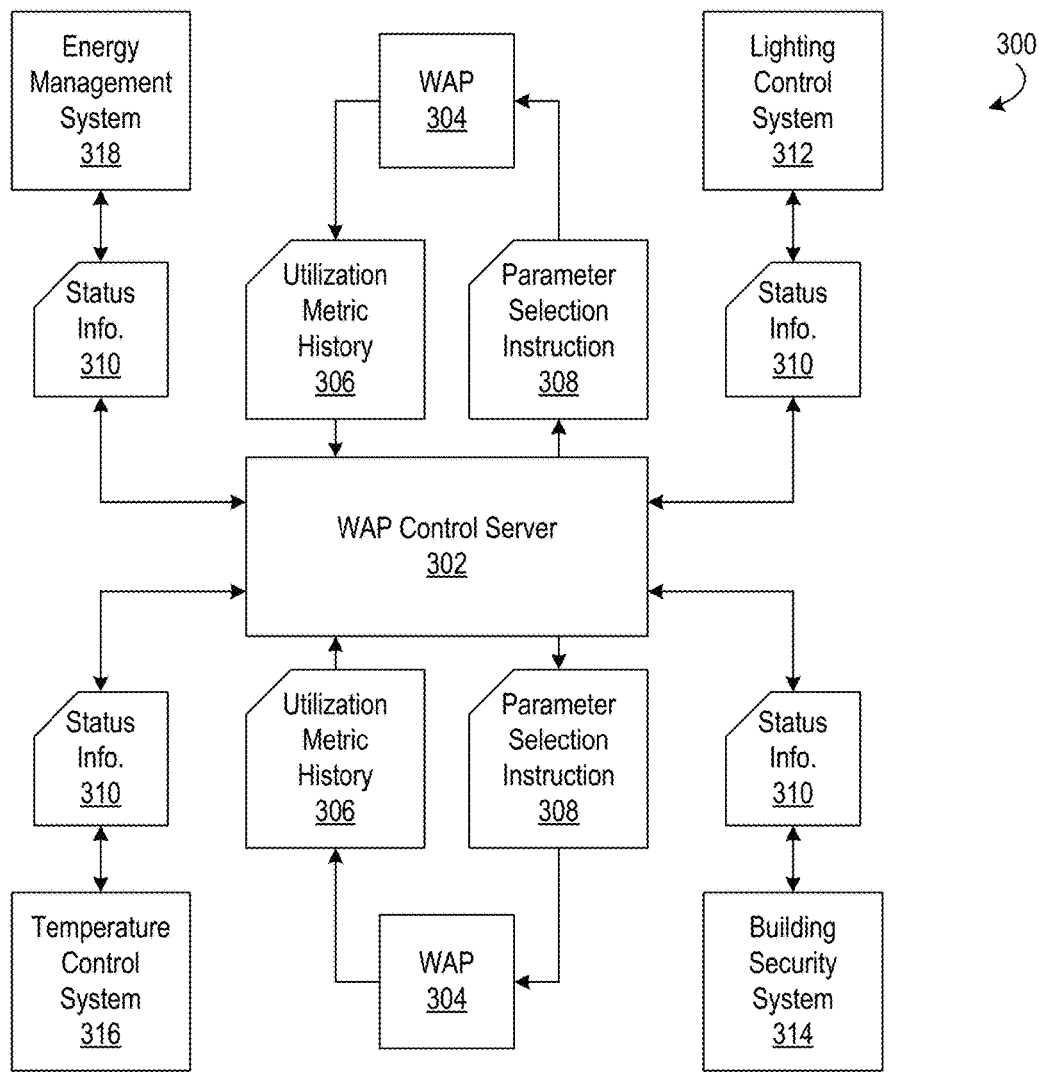
FIG. 3 illustrates an example of an implementation of a system in which multiple wireless access points are in signal communication with a wireless access point control server in accordance with aspects described herein.

FIG. 3 illustrates a block diagram of a system 300 in which a WAP control server 302 is in signal communication with multiple WAPs 304 and manages the configuration of those WAPs. The WAP control server 302 may be the same as or at least similar to the WAP control server 352 discussed above with reference to FIG. 2B. The WAPs 304 may be the same as or at least similar to the WAP 200 or the WAP 250 also discussed above with reference to FIG. 2A and FIG. 2B respectively.

As seen in FIG. 3, a WAP 304 transmits a utilization metric history 306 to the WAP control server 302 which stores the utilization metric history at a data store in response. In some example implementations, the WAP 304 may delete the utilization metric history 306 after transmitting it to the WAP control server 302 in order to free up storage space for a subsequent utilization metric history generated by the WAP. A WAP 304 may transmit a utilization metric history 306 to the WAP control server 302 each time the utilization metric history is updated with new utilization metric measurements or at regular intervals (e.g., every hour, once a day).

As also seen in FIG. 3, the WAP control server 302 transmits a parameter selection instruction 308 to a WAP 304. The parameter selection instruction 308 identifies an operating parameter of the WAP 304 and specifies a value for that operating parameter. As described above, the value specified for the operating parameter is based on the utilization metric correlations identified. In response to receipt of the parameter selection instruction 308, the WAP 304 sets the identified operating parameter to the value specified. The WAP control server 302 may transmit the parameter selection instruction 308 in response to determining that a better operating parameter is available (e.g., a better channel) within the wireless environment surrounding a WAP 304, in response to determining that a utilization metric measurement received from a WAP has crossed a metric measurement threshold, in response to obtaining new utilization metric correlations, or at regular intervals (e.g., every hour, once a day). The parameter selection instruction 308 may identify multiple operating parameters (e.g., radio frequency band, channel, and wireless networking standard) and specify a value for each operating parameter identified. In addition, the parameter selection instruction 308 may identify a sequence of values for an operating parameter and a corresponding sequence of timeframes in which a WAP 304 should set those operating parameters. As also seen in FIG. 3, the WAP control server 302, in this example, receives status information 310 a lighting control system 312, a building security system 314, and a temperature control system 316, and an energy management system 318. The lighting control system 312 may provide status information indicating the activation or deactivation of one or more lights at a location; the building security system 314 may provide status information indicating the activation of an alarm at a location; the temperature control system may provide status information indicating a thermostat setting at the location; and the energy management system 318 may provide status information indicating an energy consumption measured at the location.

Figure 4:
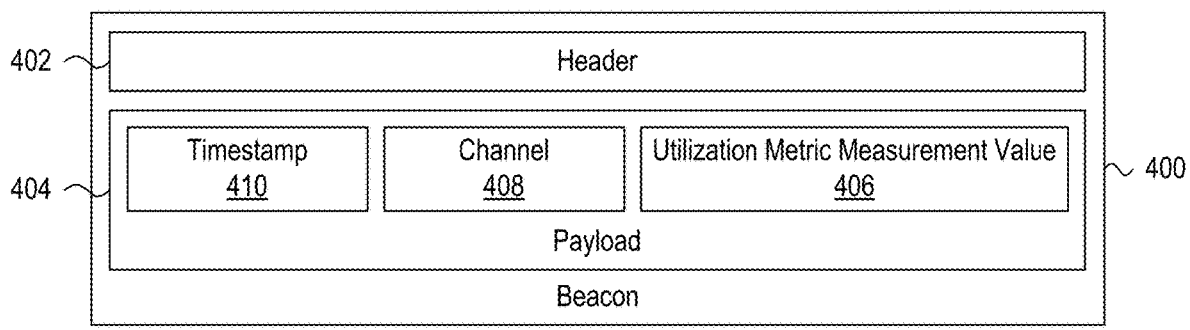
FIG. 4 illustrates an example of an implementation of a beacon transmitted by a wireless access point in accordance with aspects described herein.

Referring now to FIG. 4, an example of a beacon 400 transmitted by a wireless access point that includes utilization information collected by a WAP. As seen in FIG. 4, the beacon 400 includes a header 402 and a payload 404. The header 402 of the beacon 400 may include information that identifies the WAP that transmitted the beacon, e.g., the MAC address of the WAP. The payload 404 of the beacon 400 is thus utilized to deliver the utilization information obtained by the WAP to a neighboring WAP. The utilization information in the payload 404, in this example, includes a measurement value 406 for a utilization metric, the operating channel 408 of the WAP when the WAP measured the utilization metric, and a timestamp 410 at which the utilization metric was measured.

It will be appreciated that the payload of a beacon may include additional or alternative utilization information. For example, the payload of a beacon may include a sequence of measurement values for a utilization metric (e.g., the previous x number of measurement values obtained by the WAP for that utilization metric), respective measurement values for multiple types of utilization metrics (e.g., a total number of clients connected to the WAP and a bandwidth utilization of the WAP), and other types of utilization information that will be appreciated with the benefit of this disclosure. It will also be appreciated that the amount of utilization information transmitted in a particular beacon may depend on the maximum size of the payload of the beacon. In addition, the utilization information may additional or alternatively be injected into the headers of the transmissions from a WAP such that other WAPs may read the utilization information in those headers during a scan of the wireless environment upon boot-up. The boot-up procedure for a WAP may thus include scanning the wireless environment to determine a radio frequency band and corresponding channel to set as its operating band and operating channel. As part of the boot-up process, the WAP may extract the utilization information from the payloads (or headers) of the transmissions from the other WAPs within that environment and select an operating band and operating channel based on the utilization information extracted.

Referring now to FIG. 5A, an example of an implementation of a utilization metric history 500 is shown. The utilization metric history 500, in this example, is configured as a table in which each row of the table corresponds to a utilization metric measurement record 502 and in which the columns of the table correspond to the data elements of the utilization metric measurement records. For clarity not all of the utilization metric measurement records 502 have been labeled in FIG. 5A. A WAP may update the utilization metric history 500 by adding new utilization metric measurement records as new utilization metric measurements are obtained.

The data elements of the utilization metric measurement records 502, in this example, include a frequency band data element 504, a channel data element 506, and a timestamp data element 508. The utilization metric measurement records also include one or more data elements corresponding to the one or more utilization metric measurements obtained by the WAP. As noted above, a WAP may measure one or more types of utilization metrics and store the utilization metric measurements obtained in the utilization metric history. Accordingly a utilization metric measurement record may include data elements for the utilization metric measurements obtained as well as data elements for channel metrics derived from the channel metric measurements obtained (e.g., an overall utilization metric). The utilization metric history 500 shown by way of example in FIG. 5A includes a first utilization metric data element 510 corresponding to the total number of clients connected to the WAP during the measurement period and a second utilization metric data element 512 corresponding to the bandwidth utilized at the WAP during the measurement period. Other utilization metric histories may include data elements corresponding to additional or alternative utilization metrics which will be appreciated with the benefit of this disclosure. In some example implementations, measurement periods may be uniquely identified via a numeric identifier that sequentially increments for each measurement period. It should also be appreciated that the values indicated in the various utilization metric measurement records 502 of FIG. 5A are merely placeholder values used for illustration and are not intended to be an accurate representation of the values a WAP may obtain during a measurement period.

As described above, a WAP or a WAP control server may analyze a utilization metric history (such as utilization metric history 500) to determine correlations between utilizations and various timeframes. As seen in FIG. 5A, for example, the utilization metric measurement records 502, obtained at ten minute increments indicate an increasing utilization starting at around 6:00 AM at which time the WAP operates on channel 1. As seen in the successive utilization metric measurement records 502, the number of clients connected to the WAP increase (e.g., from one client to six clients) and the percentage of bandwidth utilization at the WAP increases (e.g., from 10% to 85%). As also seen in the utilization metric history 500, the WAP changed its operating channel from channel 1 to channel 11 sometime between 7:00 AM and 7:10 AM. The WAP may have implemented such a change, for example, based on utilization information provided by a neighboring WAP (e.g., to the WAP itself or to a WAP control server) indicating that WAP is also currently operating on channel 1 and expects a relatively high utilization starting around 7:00 AM. To avoid or mitigate interference with that other WAP, the WAP may switch to a different channel (e.g., channel 11) around the time the increased utilization at that other WAP is expected to occur. To indicate the expectation, various techniques may employed. In some example implementations, for example, alphanumeric strings may be utilized with an expectation parameter, e.g., "higher" or "lower." An expectation may also include or otherwise be associated with a value indicating the likelihood that utilization will increase or decrease, e.g., a confidence score for the expectation. A percentage likelihood such as those described above may be employed as the confidence value for the expectation, e.g., a 70% percentage likelihood that the utilization will increase or decrease. In other example implementations, numeric values may be used, e.g., a 1 where the utilization is expected to be higher and a 0 where utilization is expected to be lower. Where numeric values are employed, the value may encode the likelihood that the utilization will increase or decrease. For example, a positive sign ("+") may be utilized to indicate the utilization is expected to increase and a negative sign ("−") may be utilized to indicate the utilization is expected to decrease. As an example, an expectation of "+7" may indicate that utilization of a WAP is expected to increase with a confidence of 70%, and an expectation of "−9" may indicate that utilization is expected to decrease with a confidence of 90%. In addition, the magnitude of the value may indicate the relative confidence that utilization is expected to increase or decrease. As another example, an expectation of "+8" may indicate that utilization of a WAP is likely to increase with greater confidence (e.g., 80% confident that utilization is likely to increase) as compared to an expectation of "+4" (e.g., 40% confident that utilization is likely to increase). Additional examples will be appreciated with the benefit of this disclosure.

Referring now to FIG. 5B, an example of an implementation of utilization information that may be transmitted by a neighboring wireless access point (WAP) is shown. A WAP that receives the utilization information from a neighboring WAP may store the utilization information received in a table of records such as the table 520 shown by way of example in FIG. 5B. The table 520 includes utilization information records 522 in which the columns of the table correspond to data elements of the utilization information records. Again not all of the utilization information records 522 have been labeled in FIG. 5B for clarity. A WAP may update the table 520 by adding new utilization information records as new utilization information is received from neighboring WAPs.

The data elements of the utilization information records 522, in this example, include an identifier data element 524, a frequency band element 526, a channel data element 528, and a timestamp data element 530. In some example implementations, the utilization information transmitted by the WAP may only include the operating channel (rather than both the channel and the frequency band), and the WAP receiving the utilization information may derive the frequency band from the channel indicated. The identifier data element 524 indicates a unique identifier associated with the neighboring WAP that transmitted the utilization information (e.g., a MAC address of the neighboring WAP). The utilization information records also include one or more data elements corresponding to the one or more utilization metric measurements obtained by the WAP. As noted above, the utilization metric measurements may include both quantitative and qualitative measurements. Accordingly the table 520 of utilization information records 522, in this example, likewise includes a first utilization metric data element 532 corresponding to the total number of clients connected to the neighboring WAP during the measurement period, a second utilization metric data element 534 corresponding to the bandwidth utilized at the WAP during the measurement period, and a third utilization metric data element 536 indicating a qualitative assessment of the utilization of the neighboring WAP. In some example implementations, the utilization information transmitted by the neighboring WAP may include a qualitative assessment of its utilization based on a comparison of one or more utilization metric measurements to one or more respective utilization metric measurement thresholds. In other example implementations, the neighboring WAP may only include the utilization metric measurements in the transmission, and the WAP that receives the utilization information may derive the qualitative assessments of the utilization of the neighboring WAP likewise based on a comparison of the utilization metric measurements received to one or more respective utilization metric measurement thresholds.

As seen in the example utilization information records 522 of FIG. 5B, utilization of the neighboring WAP sharply increases between 6:00 AM and 8:00 AM both in terms of the number of clients connected to the neighboring WAP and the percentage of bandwidth utilization at the neighboring WAP. Accordingly utilization of the neighboring WAP becomes impaired around 7:00 AM as the percentage of bandwidth utilized at the neighboring WAP (e.g., 95%) reaches the maximum available bandwidth. A WAP receiving this utilization information from the neighboring WAP may determine the correlation between the increased utilization of the neighboring WAP and the timeframe of 6:00 AM-8:00 AM. Since the utilization information transmitted by the neighboring WAP includes its operating channel (e.g., channel 1), the WAP receiving the utilization information may determine to switch to an operating channel other than channel 1 (e.g., channel 11) in order to avoid or mitigate interference with or from the increased traffic on the operating channel of the neighboring WAP. Additional examples will be appreciated with the benefit of this disclosure.

Referring now to FIG. 5C, an example of an implementation of status information that may be transmitted by a remote system or device configured to operate within the location at which a wireless access point (WAP) is deployed is shown. A WAP that receives the utilization information from a remote system or device may likewise store the utilization information received in a table of records such as the table 540 shown by way of example in FIG. 5C. The remote system or device may be configured, in some example implementations, to transmit its statue information in a similar fashion as a neighboring WAP, e.g., at periodic intervals and using a beacon. Accordingly a WAP may receive the status information directly from the remote system or device. In other example implementations, the remote system or device may be in wired or wireless signal communication with a central server (e.g., a WAP control server) via a network such as, e.g., the Internet and/or a service provider network. Accordingly, a remote system or device may transmit its status information to the central server, and the central server may route the status information to one or more WAPs, e.g., the WAPs deployed to the location within which the remote system or device is associated with (e.g., configured to operate). Accordingly a WAP may also receive the status information indirectly from the remote system or device, e.g., via another device that routes the status information to the WAP from the remote system or device.

The table 540 includes status information records 542 in which the columns of the table correspond to the data elements of the status information records. Again, for clarity, not all of the status information records 542 have been labeled in FIG. 5C. A WAP may update the table 540 by adding new status information records as new status information is received from a remote system or device, e.g., directly or indirectly. The data elements of the status information records 542, in this example, include an identifier data element 544 and a timestamp data element 546. The identifier data element 544 may indicate a unique identifier associated with the remote system or device (e.g., a serial number, a customer number, etc.). The status information records 542, in this example, indicate the date and time a remote system or device was activated and deactivated. Accordingly the status information records 542, in this example, also include a status data element 548 that indicates an activation status (e.g., activated or deactivated) and a day data element 550 indicating a day-of-the-week for the activation status. The status information received at the WAP may include the indication of the day-of-the-week or the WAP may derive the day-of-the-week from the timestamp included in the status information received.

As noted above, the status of a system or device configured to operate within the location at which a WAP is deployed may be advantageously utilized to assess the likelihood of whether that WAP will be utilized during various timeframes. The status information records 542 in FIG. 5C may represent the type of status information a home security system may provide. As seen in these example status information records 542, the home security system is consistently activated between 7:00 AM and 8:00 AM and then consistently deactivated between 6:00 PM and 7:00 PM. A WAP or a WAP control server may receive this status information and determine that this pattern of activation and deactivation indicates when the occupant is and is not at home (e.g., when the occupant leaves for work in the morning and returns home from work in the evening) and thus likely or not likely to utilize the WAP. Accordingly the WAP or the WAP control server and conclude that the likelihood of the occupant utilizing the WAP between 8:00 AM and 6:00 PM to be relatively low. Based on this determination, the WAP may select one or more of its operating parameters or the WAP control server may select one or more operating parameters for the WAP. For example, the WAP or WAP control server may select a relatively low transmit power for the timeframe of 8:00 AM-6:00 PM. The WAP or WAP control server may also, in some circumstances, decide to completely deactivate in response to receipt of status information from a remote system or device. Additional examples will be appreciated with the benefit of this disclosure. The likelihood of WAP utilization may be quantified, for example, as a percentage likelihood that the WAP will be utilized for a particular time period, e.g., a 75% likelihood that the WAP will be utilized between the hours of 6:00 PM and 11:00 PM. Additional examples will be appreciated with the benefit of this disclosure. Furthermore, in some example implementations, a percentage likelihood of less than or equal to 40% may be considered to be a relatively low likelihood that the WAP will be utilized while a percentage likelihood of greater than or equal to 60% may be considered to be a relatively high likelihood that the WAP will be utilized. In addition the WAP or WAP control server may combine status information from multiple systems (e.g., a home security system and a temperature control system) to determine the likelihood that the WAP may be utilized. As an example, a WAP or a WAP control server may compute an average percentage likelihood using a percentage likelihood determined for a home security system and a percentage likelihood determined for a temperature control system. Additional examples will be appreciated with the benefit of this disclosure.

The table below illustrates example correlations between utilization and the time-of-day that may be identified through an analysis of one or more utilization metric histories. Again the values indicated in the table below are simply used for illustration.

TABLE 1

EXAMPLE CORRELATIONS BETWEEN UTILIZATION AND TIME-OF-DAY

| Frequency Band | Channel | Time-of-Day | Overall Utilization |
|---|---|---|---|
| 2.4 GHz | 1 | 4:30 AM-8:30 AM | 2/10 |
| 2.4 GHz | 1 | 8:30 AM-5:30 PM | 9/10 |
| 2.4 GHz | 11 | 5:30 PM-11:30 PM | 6/10 |
| 2.4 GHz | 1 | 11:30 PM-4:30 AM | 1/10 |

As seen in Table 1 above, utilization of a WAP has been determined to be relatively low between the hours of 4:30 AM-8:30 AM and 11:30 PM-4:30 AM, and the utilization of the WAP and determined to be relatively high between the hours of 8:30 AM-5:30 PM and 5:30 PM-11:30 PM. The WAP may transmit this utilization information to other WAPs or a WAP control server which may select one or more operating parameters based on the received utilization information that indicates the timeframes during which utilization of the WAP is expected to be relatively high or relatively low.

As described above, utilization metric correlations may be identified for additional and alternative timeframes. The table below illustrates example correlations between utilization and the day of the week.

TABLE 2

EXAMPLE CORRELATIONS BETWEEN UTILIZATION AND DAY OF THE WEEK

| Frequency Band | Channel | Day of the Week | Overall Utilization |
|---|---|---|---|
| 2.4 GHz | 1 | Monday | 9/10 |
| 2.4 GHz | 1 | Tuesday | 8/10 |
| 2.4 GHz | 1 | Wednesday | 8/10 |

TABLE 2-continued

EXAMPLE CORRELATIONS BETWEEN UTILIZATION
AND DAY OF THE WEEK

| Frequency Band | Channel | Day of the Week | Overall Utilization |
|---|---|---|---|
| 2.4 GHZ | 1 | Thursday | 7/10 |
| 2.4 GHz | 1 | Friday | 5/10 |
| 2.4 GHz | 11 | Saturday | 2/10 |
| 2.4 GHz | 11 | Sunday | 2/10 |

As seen in Table 2 above, utilization of the WAP has been determined to be relatively higher on weekdays (e.g., Monday-Friday) and relatively lower on weekends (e.g., Saturday-Sunday). Accordingly, a neighboring WAP may receive this utilization information and, based on these identified correlations, switch its operating channel to channel 11 during weekdays and switch its operating channel to channel 1 during weekends.

As also described above, channel metric correlations may be identified for multiple timeframes. The table below illustrates example correlations between utilization and times-of-the-day on various days of the week.

TABLE 3

EXAMPLE CORRELATIONS BETWEEN UTILIZATION
AND TIMES-OF-THE-DAY ON DAYS OF THE WEEK

| Frequency Band | Channel | Day of the Week | Time-of-Day | Overall Utilization |
|---|---|---|---|---|
| 2.4 GHz | 1 | Monday | 4:30 AM-8:30 AM | 8/10 |
| 2.4 GHz | 1 | Monday | 8:30 AM-5:30 PM | 4/10 |
| 2.4 GHz | 1 | Monday | 5:30 PM-11:30 PM | 5/10 |
| 2.4 GHz | 1 | Monday | 11:30 PM-4:30 AM | 8/10 |
| ... | ... | ... | ... | ... |
| 2.4 GHz | 11 | Saturday | 4:30 AM-8:30 AM | 5/10 |
| 2.4 GHz | 11 | Saturday | 8:30 AM-5:30 PM | 7/10 |
| 2.4 GHz | 11 | Saturday | 5:30 PM-11:30 PM | 8/10 |
| 2.4 GHz | 11 | Saturday | 11:30 PM-4:30 AM | 4/10 |
| ... | ... | ... | ... | ... |

As seen in Table 3, above, utilization of a WAP varies differently throughout the day on different days of the week. In this example, utilization of the WAP on Mondays has been determined to be relatively higher between 4:30 AM-8:30 AM and 11:30 PM-4:30 AM and relatively lower between the hours of 8:30 AM-5:30 PM and 5:30 PM-11:30 PM. On Saturdays, however, utilization of the WAP has been determined to be relatively higher between 8:30 AM-5:30 PM and 5:30 PM-11:30 PM and relatively lower between 4:30 AM-8:30 AM and 11:30 PM-4:30 AM. These example correlations illustrate the types of nuances that may be advantageously identified through the storage and analysis of utilization metric histories and thus used to intelligently configure WAPs to improve their performance in the wireless environments in which they reside.

As also described above, a WAP control server may issue parameter selection instructions to one or more WAPs that change one or more of their operating parameters in response to receipt of those instructions. In some example implementations, a parameter selection instruction may only specify a particular radio frequency band and a particular channel to use, and the WAP may immediately change its operating radio frequency band and operating channel to those specified in the parameter selection instruction received. As described above, however, a parameter selection instruction may specify a sequence of operating parameters to utilize during a corresponding sequence of timeframes. The table below illustrates an example of a sequence of operating parameters.

TABLE 4

EXAMPLE PARAMETER SELECTION INSTRUCTION
WITH SEQUENCE OF OPERATING PARAMETERS

| Timeframe | Radio Frequency Band | Channel |
|---|---|---|
| 3:00 AM-6:00 AM | 2.4 GHz | 1 |
| 7:00 AM-10:00 AM | 2.4 GHz | 6 |
| 10:00 AM-2:00 PM | 5 GHz | 36 |
| 2:00 PM-5:00 PM | 5 GHz | 40 |
| 5:00 PM-8:00 PM | 5 GHz | 44 |
| 8:00 PM-12:00 AM | 2.4 GHz | 11 |
| 12:00 AM-3:00 AM | — | — |

As seen in Table 4 above, the example parameter selection instruction instructs a WAP to switch between the 2.4 GHz and the 5 GHz radio frequency bands throughout the day. The example parameter selection instruction also instructs to switch between various channels within those respective frequency bands throughout the day. As noted above, a parameter selection instruction may also identify one or more timeframes in which the WAP should deactivate, for example, as shown in Table 4 above between 12:00 AM and 3:00 AM. Additional and alternative examples of correlations and parameter selection instructions will be appreciated with the benefit of this disclosure.

Figure 6:
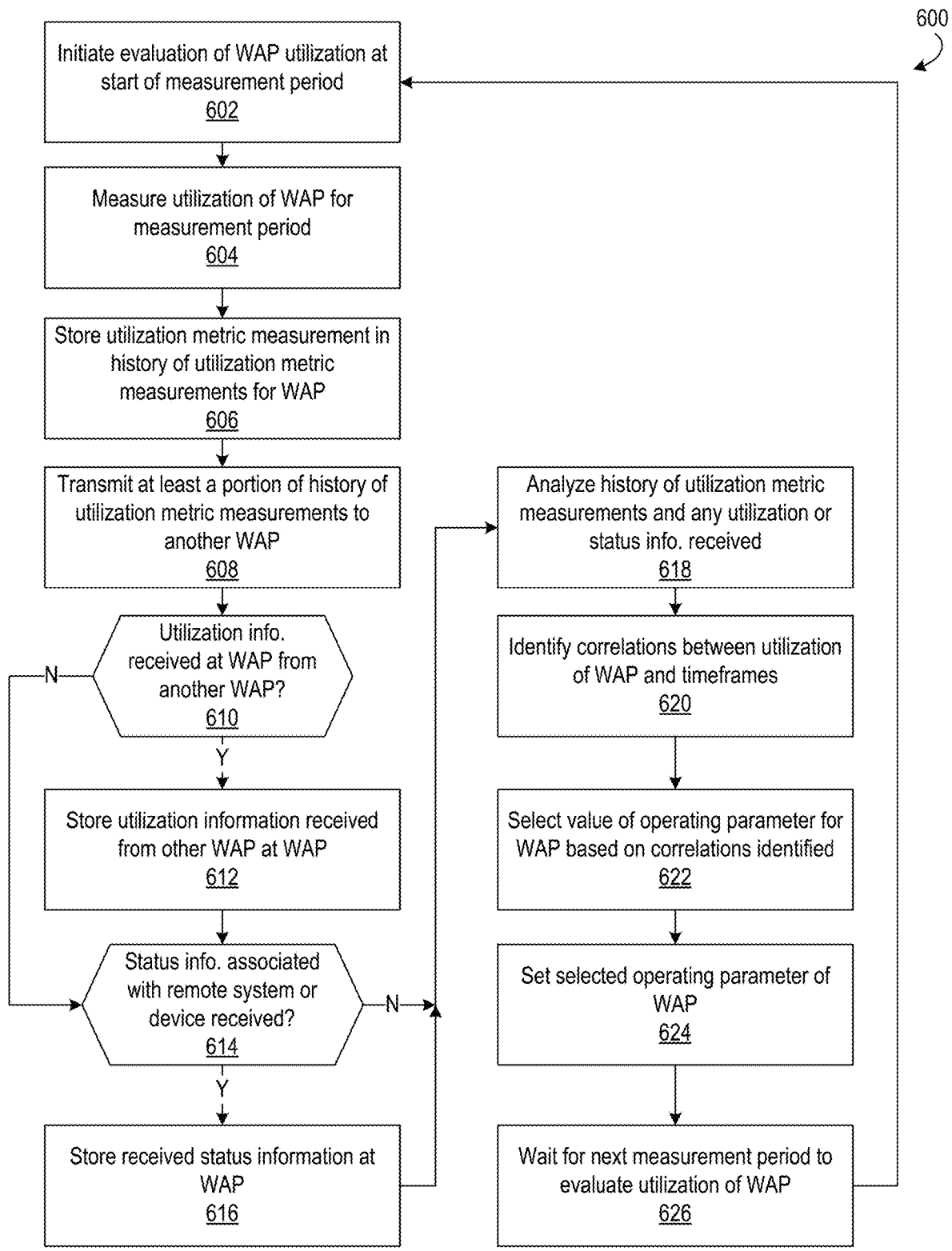
FIG. 6 illustrates a flowchart of example method steps for configuring an operating parameter of a wireless access point in accordance with aspects described herein.

Referring to FIG. 6, a flowchart of example method steps for configuring an operating parameter of a wireless access point (WAP) is shown. As noted above, a WAP may periodically measure its utilization at regular intervals (e.g., every ten minutes, every hour, etc.). Accordingly the WAP may initiate evaluation of its utilization at the start of a new measurement period (block 602). During the measurement period, the WAP may measure its utilization during the measurement period (block 604). The WAP may measure one or more types of utilization metrics as described above (e.g., number of connected client devices, bandwidth utilization, etc.) and store the utilization metric measurements obtained in a history of utilization metric measurements (block 606) at the WAP. The WAP may also transmit at least a portion of the history of utilization metric measurements to another WAP (block 608), e.g., in a beacon transmitted to the other WAP.

As described above, the WAP may also receive utilization information from another WAP, e.g., in a beacon transmitted from the other WAP. If the WAP receives utilization information from another WAP (block 610:Y), then the WAP may store the utilization information received (block 612), e.g., for subsequent analysis. As also described above, the WAP may receive status information from one or more remote systems or devices deployed within the location at which the WAP is deployed. If the WAP receives status information from a remote system or device (block 614:Y), then the WAP may store the status information received (block 616), e.g., for subsequent analysis. The WAP may, however, not receive any utilization information (block 610:N) or status information (block 614:N) during or between measurement periods.

After measuring its utilization, the WAP may analyze the history of utilization metric measurements and any utilization information and/or status information received (block 618). During this analysis, the WAP may determine correlations between the utilization of the WAP and various timeframes (block 620) as described above. Based on the correlations identified, the WAP may select a value for one of its operating parameters (block 622)—e.g., a radio frequency band, operating channel, transmit power, and the like—and set that operating parameter to the value selected (block 624). The WAP may then wait for the next measurement period to evaluate its utilization (block 626), and again initiate evaluation of its utilization (block 602) at the start of next measurement period.

Figure 7:
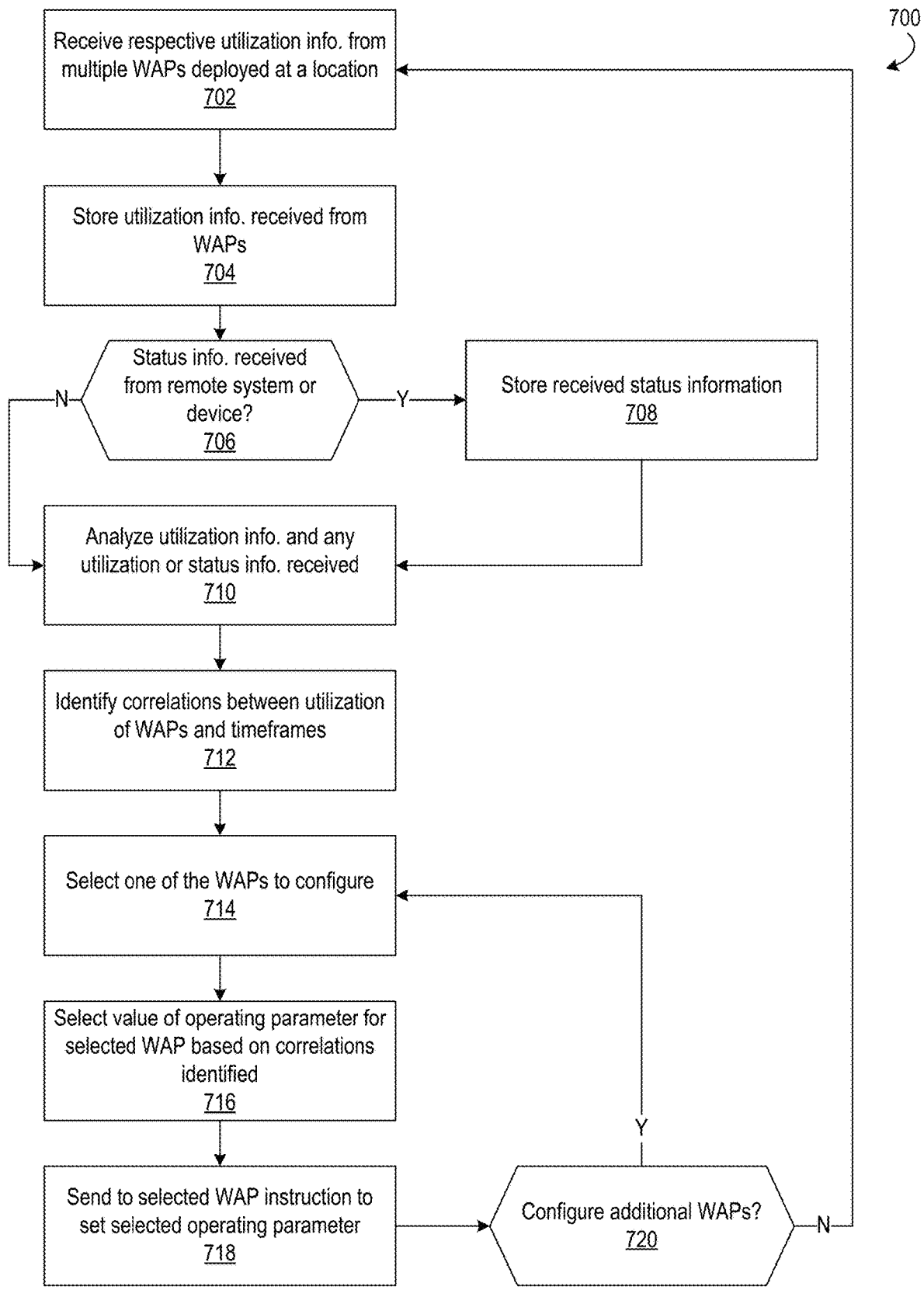
FIG. 7 illustrates a flowchart of example method steps for configuring respective operating parameters of multiple wireless access points using a wireless access point control server in accordance with aspects described herein.

Referring to FIG. 7, a flowchart of example method steps for configuring respective operating parameters of multiple wireless access points (WAPs) using a WAP control server is shown. As described above, a WAP control server may receive utilization information from multiple WAPs deployed at a location (block 702), and store the utilization information received from the WAPs (block 704) for subsequent analysis. As also described above, the WAP control server may also receive status information from one or more remote systems or devices. Accordingly, if the WAP control server receives status information from a remote system or device (block 706:Y), then the WAP control server may store the status information received (block 708) for subsequent analysis. As noted above, however, the WAP control server may not always receive status information from a remote system or device (block 706:N). Having stored the utilization information received from the WAPs, the WAP control server may analyze the utilization information and any status information received (block 710) and determine correlations between the utilization of the WAPs and various timeframes (block 712).

Having identified correlations associated with the utilization of the WAPs, the WAP control server may select one of the WAPs to configure based on those correlations (block 714). The WAP control server may select, for the selected WAP, a value for one of its operating parameters based on the correlations identified (block 716) and send to the selected WAP an instruction to set the selected operating parameter to the selected value (block 718). As described above, in response to receipt of the instruction, the selected WAP may set the selected operating parameter to the value indicated therein.

Figure 8:
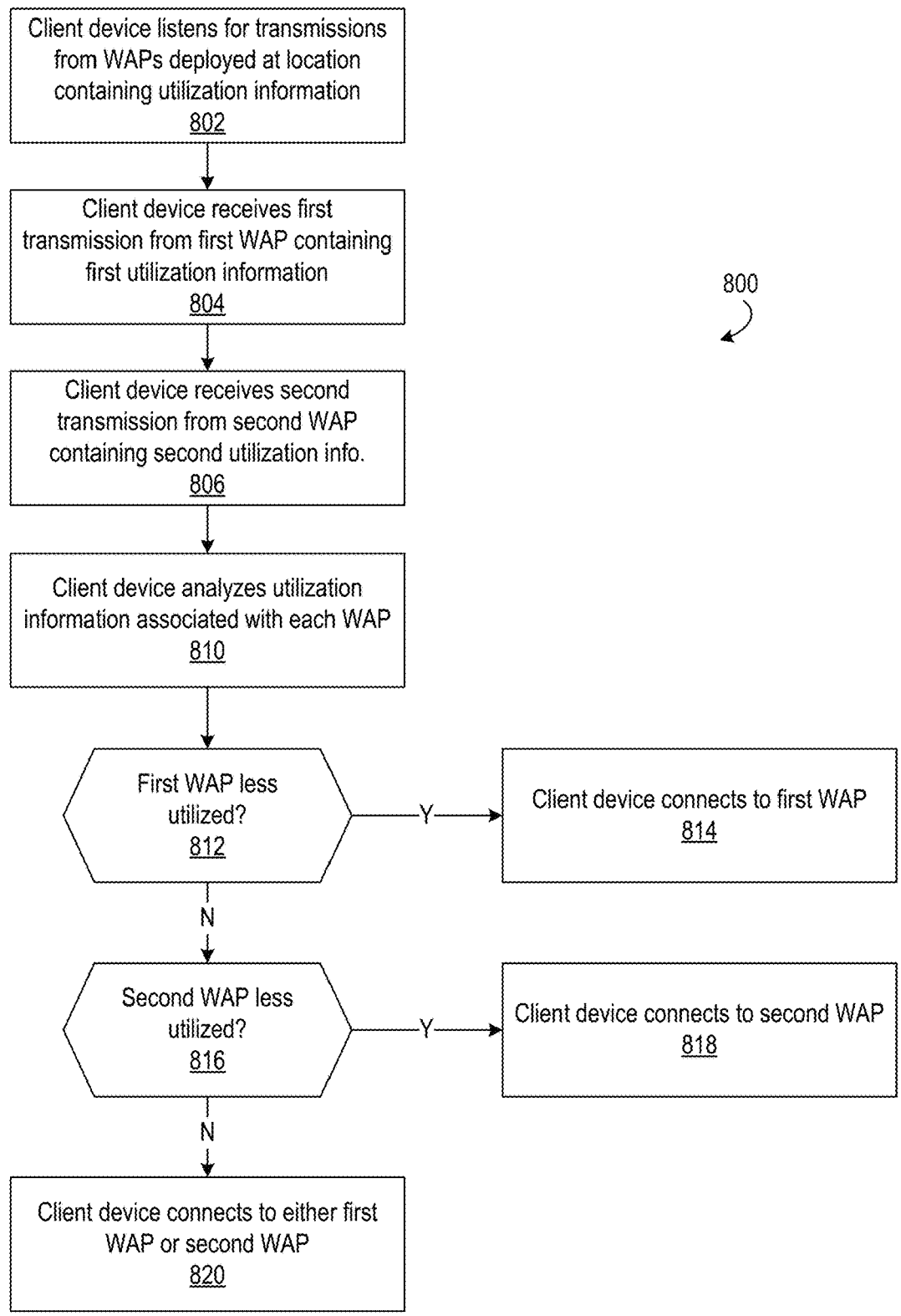
FIG. 8 illustrates a flowchart of example method steps for connecting a client device to one of multiple wireless access points available at a location in accordance with aspects described herein.

Referring to FIG. 8, a flowchart of example method steps for connecting a client device to one of multiple wireless access points (WAPs) available at a location is shown. A client device positioned within a location at which multiple WAPs are deployed may listen for transmissions containing utilization information from those WAPs (block 802). As describe above, the WAPs may periodically transmit beacons containing utilization metric measurements respectively obtained by the WAPs. Accordingly the client device may receive a first transmission from a first WAP containing first utilization information for that first WAP (block 804) and receive a second transmission from a second WAP containing second utilization information for that second WAP (block 806). The client device may then analyze the utilization information received in the respective transmissions (block 810) in order to determine which one of the WAPs is less utilized.

If the client device determines, based on the utilization information received that the first WAP is the less utilized WAP (block 812:Y), then the client device may choose connect to the first WAP (block 814). If however, the client device determines, based on the utilization information received that the first WAP is not the less utilized WAP (block 812:N) but determines, however, that the second WAP is the less utilized WAP (block 816:Y), then the client device may choose to connect to the second WAP (block 818). If, however, the client device determines that the second WAP is also not the less utilized WAP (block 816:N)—i.e., if the client device determines that there is a negligible difference in the utilization of each WAP—then the client device may choose to connect to either the first WAP or the second WAP. The client device may determine that the difference in utilization is negligible where the respective utilization metric measurements received from the WAPs are equal or substantially the same, i.e., where the difference between the respective utilization metric measurements does not exceed a predetermined difference threshold (e.g., 10%). As also noted above, where there is a negligible difference in utilization metric measurements, a client device may select to one of the available WAPs at random or according to some selection scheme, e.g., connect to the WAP having the highest received signal strength indicator (RSSI) for its transmissions. It will be appreciated that the client device may determine which WAP to connect to based on a current utilization indicated in the utilization information received or an expected utilization for a subsequent timeframe indicated in the utilization information received.

With respect to changing the operating parameters of a WAP, various strategies may be employed. In some example implementations, a WAP may change one or more of its operating parameters (e.g., the operating channel) immediately in response to determining that a current utilization metric measurement has crossed a utilization metric measurement threshold. Such a reactive change to the operating parameters of the WAP, however, may negatively impact any client devices currently connected to the WAP. To mitigate the negative impact on client devices currently connected to the WAP, the WAP, in some other example implementations, may be configured to only change its operating parameters during off-peak usage hours as determined by the history of utilization metric measurements collected by the WAP. In addition, the WAP, in some example implementations, may be configured such that it is limited in the number of times it is permitted to change its operating parameters within a predetermined time period, e.g., no more than three changes to its operating parameters within a 24 hour period or no more than one change to its operating parameters within a one hour period. Furthermore, the WAPs, in some example implementations, may be configured to transmit an announcement indicating a change to the operating parameters of the WAP (e.g., a "channel switch announcement") to allow rapid re-authentication of any client devices connected to the WAP during the change of operating parameters. Moreover, the WAPs, in some example implementations, may be configured such that they are not permitted to change their operating parameters when, e.g., a threshold number of client devices are currently connected to the WAPs or the WAPs are handling a threshold level of traffic between the client devices. Such techniques likewise mitigate any negative affects resulting from changing WAP operating parameters while actively servicing client devices.

In addition, qualitative assessments may be employed to describe the utilization of the WAP (e.g., the number of clients connected, the percentage of bandwidth utilized, etc.) based on the history of utilization metric measurements. For example, in some implementations, utilization may be categorized into four different levels for various time periods based on the history of utilization metric measurements, e.g., "perfect," "good," "impaired," and "unusable." The values that define the boundaries between utilization categories may depend on the particular implementations employed and may, in some example implementations, be configurable parameters. As one example, utilization of a WAP may be categorized as "perfect" where the percentage of bandwidth utilized at the WAP is between 0% and less than 10%; may be categorized as "good" where the percentage of bandwidth utilized is between 10% and less than 50%; may be categorized as "impaired" where the percentage of bandwidth utilized is between 50% and less than 90%; and may be categorized as "unusable" where the bandwidth utilization is greater than 90%. Additional examples will be appreciated with the benefit of this disclosure. Each level may correspond to a respective utilization metric measurement threshold. Accordingly, a utilization of a WAP may, as an example, be categorized as "perfect" for the hours of 1:00 AM-5:00 AM when an historic utilization metric measurement for that time period is below a first utilization metric measurement threshold, as "good" for the hours of 5:00 AM-8:00 AM when an historic utilization metric measurement for that time period is between the first utilization metric measurement threshold and a second utilization metric measurement threshold, as "impaired" for the hours of 8:00 AM-4:00 PM when an historic utilization metric measurement for that time period is between the second utilization metric measurement threshold and a third utilization metric measurement threshold, and as "unusable" for the hours of 4:00 PM-10:00 PM when an historic utilization metric measurement for that time period is above the third channel metric measurement threshold. Additional examples will be appreciated with the benefit of this disclosure.

For low-level categories (e.g., "unusable" and "impaired"), the WAPs in these example implementations may be configured and permitted to change their operating parameters after various time periods. For example, when utilization of a WAP has been categorized as "unusable" for a particular time period, the WAP may be configured such that it is permitted to change its operating parameters after a fifteen minutes duration. As another example, when utilization of a WAP has been categorized as "impaired" for a particular time period, the WAP may be configured such that it is permitted to change its operating parameters after a one hour duration. Additional examples will be appreciated with the benefit of this disclosure. As noted above, in some example implementations, a WAP may be configured such that it is not permitted to change its operating parameters if the prior change occurred within a predetermined time period, e.g., the last hour.

All of the thresholds identified above may be, in some example implementations, configurable. The thresholds may be manually configurable by an individual in addition to or alternatively by the WAP itself or a control system for the WAP (e.g., the WAP control server).

Figure 9:
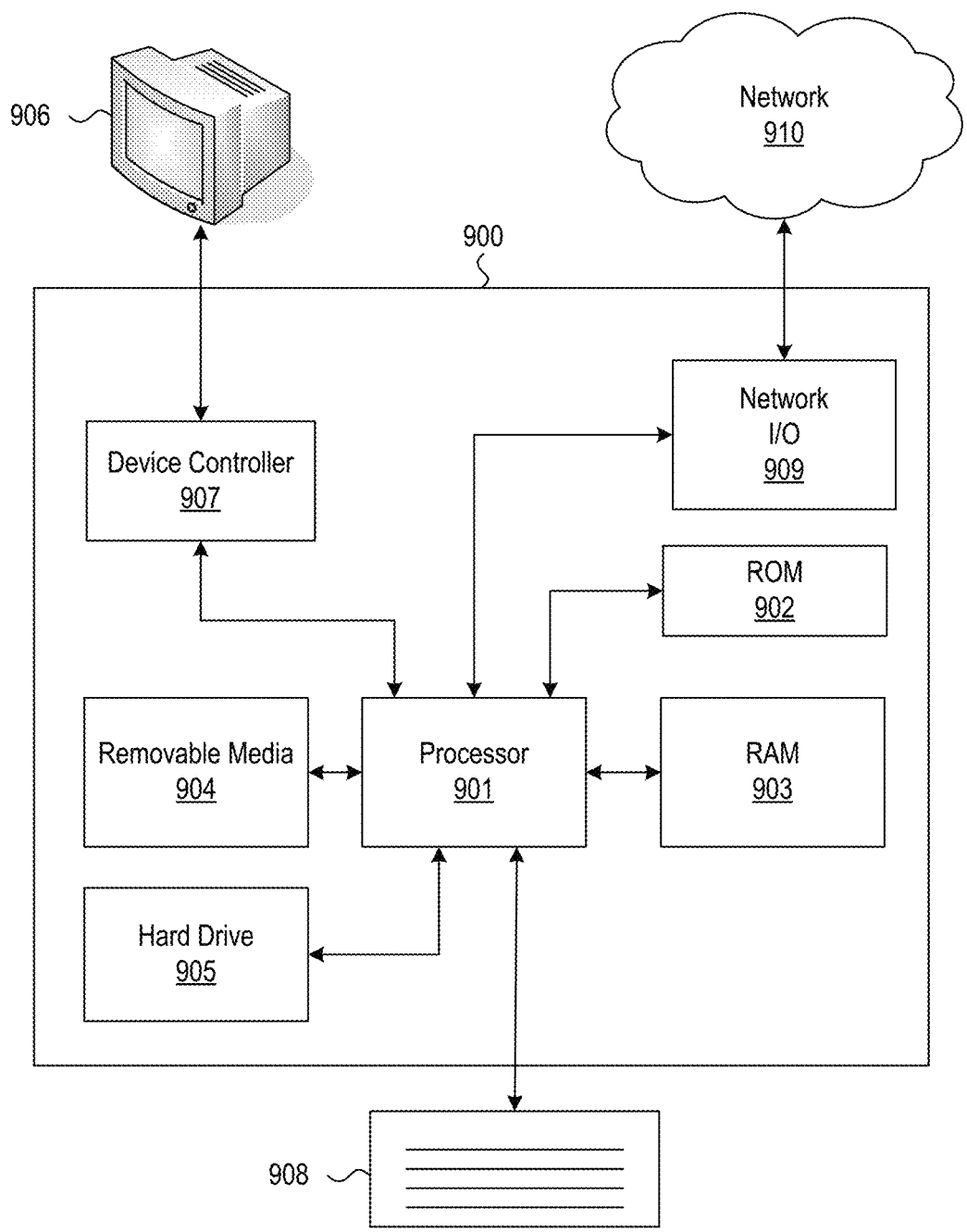
FIG. 9 illustrates an example hardware platform on which the various elements described herein can be implemented.

Referring now to FIG. 9, an example of an implementation of a hardware platform on which the various elements described herein can be implemented is shown. The computing device 900 may include one or more processors 901, which may execute instructions of a computer program to perform any of the features described herein. The instructions may be stored in any type of computer-readable medium or memory, to configure the operation of the processor 901. For example, instructions may be stored in a read-only memory (ROM) 902, random access memory (RAM) 903, removable media 904, such as a Universal Serial Bus (USB) drive, compact disk (CD) or digital versatile disk (DVD), floppy disk drive, or any other desired electronic storage medium. Instructions may also be stored in an attached (or internal) hard drive 905. The computing device 900 may include one or more output devices, such as a display 906 (or an external television), and may include one or more output device controllers 907, such as a video processor. There may also be one or more user input devices 908, such as a remote control, keyboard, mouse, touch screen, microphone, etc. The computing device 900 may also include one or more network interfaces, such as input/output circuits 909 (such as a network card) to communicate with an external network 910. The network interface may be a wired interface, wireless interface, or a combination of the two. In some embodiments, the interface 909 may include a modem (e.g., a cable modem), and network 910 may include the communication lines, the external network 909, an in-home network, a service provider's wireless, coaxial, fiber, or hybrid fiber/coaxial distribution system (e.g., a DOCSIS network), or any other desired network.

Aspects of the disclosure have been described in terms of illustrative embodiments thereof. While illustrative systems and methods as described herein embodying various aspects of the present disclosure are shown, it will be understood by those skilled in the art, that the disclosure is not limited to these embodiments. Modifications may be made by those skilled in the art, particularly in light of the foregoing teachings.

For example, the steps illustrated in the illustrative figures may be performed in other than the recited order, and that one or more steps illustrated may be optional in accordance with aspects of the disclosure. It will also be appreciated and understood that modifications may be made without departing from the true spirit and scope of the present disclosure. The description is thus to be regarded as illustrative instead of restrictive on the present disclosure.

What is claimed is:

1. A method comprising:
   determining, by a first wireless access point, prior measurements for a utilization metric;
   receiving, by the first wireless access point and from a second wireless access point:
      current utilization information indicating utilization of the second wireless access point during a first time period; and
      historical utilization information of the second wireless access point indicating a plurality of usage levels at a plurality of previous time periods that are prior to the first time period;
   determining, by the first wireless access point and based on the prior measurements and one of the current utilization information or the historical utilization information, a correlation between the utilization metric and one of the plurality of previous time periods; and
   based on a determination that the first time period corresponds to the one of the plurality of previous time periods, based on one of the plurality of usage levels at the one of the plurality of previous time periods, and based on the prior measurements for the utilization metric, determining, by the first wireless access point, a value for an operating parameter.

2. The method of claim 1, wherein the determining the value for the operating parameter comprises:
   determining the value of the operating parameter based on a historical security system utilization of the second wireless access point.

3. The method of claim 1, further comprising:
   adjusting, by the first wireless access point and based on the correlation, the value of the operating parameter.

4. The method of claim 1, wherein:
a first measurement of the prior measurements for the utilization metric comprises an indication of a channel used by the first wireless access point during measuring of the utilization metric.

5. The method of claim 1, wherein:
the utilization metric comprises one or more of: a measurement of traffic on a channel, a measurement of bandwidth available on the channel, a quantity of client devices in communication with the first wireless access point, a number of packets sent by the first wireless access point within a first predetermined time period, a number of frames sent by the first wireless access point within a second predetermined time period, or a volume of data sent by the first wireless access point within a third predetermined time period.

6. The method of claim 1, further comprising:
receiving, by the first wireless access point, status information associated with a computing device configured to operate at a location at which the first wireless access point is deployed, and
wherein the determining the value for the operating parameter comprises selecting the value for the operating parameter based further on the received status information.

7. The method of claim 6, wherein:
the computing device comprises one or more of a security system configured to monitor one or more structures, a lighting control system configured to control lighting of one or more structures, a temperature control system configured to control a temperature of one or more structures, or an energy management system configured to measure energy consumption.

8. The method of claim 1, wherein:
the operating parameter comprises one or more of: a radio frequency band, a channel within the radio frequency band, a networking standard, or a transmit power.

9. The method of claim 1, further comprising:
determining, during a next time period after the first time period and based on the current utilization information and the historical utilization information, an increase in bandwidth utilization associated with the second wireless access point; and
adjusting, based on the determined increase in bandwidth, the value for the operating parameter.

10. A method comprising:
determining, by a first wireless access point, prior measurements for a utilization metric;
receiving, from a second wireless access point:
  current utilization information indicating utilization of the second wireless access point during a first time period; and
  historical utilization information of the second wireless access point over one or more prior time periods that are prior to the first time period;
receiving, by the first wireless access point and from a computing device, status information associated with the computing device; and
determining, by the first wireless access point, a value for an operating parameter associated with the first wireless access point based, at least in part, on the prior measurements for the utilization metric, the current utilization information, the historical utilization information, and the status information.

11. The method of claim 10, wherein:
the status information comprises an activation status of the computing device, wherein the computing device is configured to operate within a location at which the first wireless access point is deployed, and
the determining the value for the operating parameter comprises adjusting the value of the operating parameter based on the activation status of the computing device.

12. The method of claim 10, further comprising:
determining, by the first wireless access point, a correlation between the utilization metric and a second time period based on the prior measurements for the utilization metric and; and
adjusting, by the first wireless access point, based on the correlation, and during the second time period, the value of the operating parameter.

13. The method of claim 10, wherein:
a first measurement of the prior measurements for the utilization metric comprises an indication of a channel used by the first wireless access point during measuring of the utilization metric; and
the utilization metric comprises one or more of a measurement of traffic on the channel, a measurement of bandwidth available on the channel, a quantity of client devices in communication with the first wireless access point, a number of packets sent by the first wireless access point, a number of frames sent by the first wireless access point, or a volume of data sent by the first wireless access point within a predetermined time period.

14. The method of claim 10, wherein: the status information comprises an activation status of lighting of one or more structures controlled by the computing device, and
the determining the value for the operating parameter comprises adjusting the value of the operating parameter based on the activation status of the lighting of one or more structures.

15. The method of claim 10, wherein:
the status information indicates that a building security system is activated during the first time period, and
the determining the value for the operating parameter comprises reducing, based on the status information, a transmit power associated with the first wireless access point.

16. The method of claim 10, wherein:
the receiving the status information comprises: receiving, by the first wireless access point and from a home security system, status information associated with the home security system; and
the method further comprises:
  receiving, by the first wireless access point and from a temperature control system, status information associated with the temperature control system; and
  the determining the value for the operating parameter comprises: determining, based on the status information associated with the home security system and the status information associated with the temperature control system, the value for the operating parameter.

17. The method of claim 10, further comprising:
determining, based on the status information, a likelihood of whether the computing device, during the first time period, utilizes the first wireless access point.

18. The method of claim 10, further comprising:
storing, by the first wireless access point, the prior measurements for the utilization metric; and
sending, by the first wireless access point and to the second wireless access point, at least a portion of the prior measurements for the utilization metric.

19. A first wireless access point comprising:
one or more processors; and
memory storing instructions that, when executed by the one or more processors, cause the first wireless access point to:
  determine prior measurements for a utilization metric;
  receive, from a second wireless access point:
    current utilization information indicating utilization of the second wireless access point during a first time period; and
    historical utilization information of the second wireless access point indicating a plurality of usage levels at a plurality of previous time periods that are prior to the first time period;
  determine, based on the prior measurements and one of the current utilization information or the historical utilization information, a correlation between the utilization metric and one of the plurality of previous time periods; and
  based on a determination that the first time period corresponds to the one of the plurality of previous time periods, based on one of the plurality of usage levels at the one of the plurality of previous time periods, and based on the prior measurements for a utilization metric, determine a value for an operating parameter.

20. The first wireless access point of claim 19, wherein the instructions, when executed by the one or more processors, cause the first wireless access point to:
  determine the value for the operating parameter by adjusting one or more of a radio frequency band, a channel, a wireless networking standard, or a transmit power.

21. The first wireless access point of claim 19, wherein the instructions, when executed by the one or more processors, further cause the first wireless access point to:
  select a subsequent time period to reconfigure the first wireless access point based on the correlation; and
  adjust the operating parameter during the subsequent time period.

22. The first wireless access point of claim 19, wherein:
  the utilization metric comprises one or more of a measurement of traffic on a channel, a measurement of bandwidth available on the channel, a quantity of client devices in communication with the first wireless access point within a first predetermined time period, a number of packets sent by the first wireless access point, a number of frames sent by the first wireless access point within a second predetermined time period, or a volume of data sent by the first wireless access point within a third predetermined time period.

23. The first wireless access point of claim 19, wherein:
  the historical utilization information indicates, over the plurality of previous time periods, activation of a security system, one or more lights, or an alarm.

* * * * *

UNITED STATES PATENT AND TRADEMARK OFFICE
CERTIFICATE OF CORRECTION

| | |
|---|---|
| PATENT NO. | : 11,228,925 B2 |
| APPLICATION NO. | : 14/789381 |
| DATED | : January 18, 2022 |
| INVENTOR(S) | : Attanasio et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 328 days.

Signed and Sealed this
Sixth Day of December, 2022

Katherine Kelly Vidal
*Director of the United States Patent and Trademark Office*